United States Patent [19]

Schneider et al.

[11] Patent Number: 5,777,621

[45] Date of Patent: Jul. 7, 1998

[54] QUALITY CONTROL MECHANISM FOR THREE-DIMENSIONAL GRAPHICS RENDERING

[75] Inventors: Philip J. Schneider; David Jevans, both of Boulder Creek, Calif.

[73] Assignee: Apple Computer, Inc., Cupertino, Calif.

[21] Appl. No.: 482,016

[22] Filed: Jun. 7, 1995

Related U.S. Application Data

[63] Continuation-in-part of Ser. No. 362,118, Dec. 22, 1994, abandoned.

[51] Int. Cl.$^6$ ................................................ G06T 15/00
[52] U.S. Cl. ........................................ 345/428; 345/429
[58] Field of Search ............................... 395/119, 120, 395/123, 124, 126, 128, 129, 130, 131, 132, 133, 152; 345/121, 122, 132, 133, 136

[56] References Cited

U.S. PATENT DOCUMENTS

| | | | |
|---|---|---|---|
| 5,043,922 | 8/1991 | Matsumoto | 395/122 |
| 5,379,371 | 1/1995 | Usami et al. | 395/128 |
| 5,384,908 | 1/1995 | Mackinlay | 395/152 |
| 5,448,686 | 9/1995 | Borrel et al. | 395/120 |
| 5,471,572 | 11/1995 | Buchner et al. | 395/139 |
| 5,489,920 | 2/1996 | Kaasila | 345/136 |
| 5,555,354 | 9/1996 | Strasnick et al. | 395/127 |

OTHER PUBLICATIONS

Nakamura, "Three-dimensional delineation of map and facility data and data control", Functional Diagram Workshop '93, Oct. 1993, pp. 1–6.

Ihm et al., "On enhancing the speed of splatting with indexing", Visualization, 1995 Conference, pp. 69–76.

Sakas et al., "Interactive visualization of large scalar voxel fields", Visualization, 1992 Conference, pp. 29–36.

Astheimer, P., et al., "Interactive modeling in high–performance scientific visualization—the vis–a–vis project", Computers in Industry, vol. 19, No. 2, May 1992, pp. 213–225.

IBM, "Multiple Types of Graphical Contexts on a Graphics Adapter", Technical disclosure Bulletin, vol. 34, No. 7B, Dec. 1991, pp. 29–30.

(List continued on next page.)

*Primary Examiner*—Joseph H. Feild
*Assistant Examiner*—Stephen Hong
*Attorney, Agent, or Firm*—Fliesler, Dubb, Meyer & Lovejoy

[57] ABSTRACT

A graphics rendering system includes a continuum, or collection, of quality control data groups, each of which contains a plurality of quality control type variables. Each of the type variables contains a value which selects among a plurality of options in a respective trade-off between rendering quality and rendering speed. Each of the quality control data groups may be associated with the respective quality index. Thus, an application program can select a point on the overall rendering speed/quality rendering trade-off, merely by selecting a quality control index value. Moreover, the application program can make the current quality control index accessible to a user, for example in such an intuitive form as an iconic "quality knob". The mechanism permits the user to have fine control over the rendering speed/quality rendering trade-off, without being concerned with adjustments to the individual rendering parameters.

22 Claims, 11 Drawing Sheets

OTHER PUBLICATIONS

Apple Computer, Inc., "QuickDraw GX—Programmer's Overview" (1994). *1.

Bergman, et al., "Image Rendering by Adaptive Refinement", Computer Graphics (1986) vol. 20, No. 4, pp. 29–37. *1.

Catmull, Edwin E., "A Subdivision Algorithm for Computer Display of Curved Surfaces", (Dec., 1974), Ph.D. Thesis, Report UTEC–CSc–74–133, Computer Science Department, University of Utah, Salt Lake City, UT. *1.

Chen, Shenchang Eric, et al., "A Progressive Multi–Pass Method for Global Illumination," Computer Graphics (Jul. 1991), vol. 25, No. 4, pp. 165–174. *1.

Clark, James H., "The Geometry Engine: A VLSI Geometry System for Graphics," Computer Graphics (1982), vol. 16, No. 3, pp. 127–133. *1.

Haeberli, Paul and Akeley, Kurt, "The Accumulation Buffer: Hardware Support for High–Quality Rendering", Computer Graphics (Aug. 1990), vol. 24, No. 4, pp. 309–318. *1.

International Standards Organization, "Information Processing Systems—Computer Graphics—Graphical Kernel System for Three Dimensions (GKS–3D) Functional Description", (1988) ISO Document No. 8805:1988 (E). *1.

Kelley, Michael, et al., "A Scalable Hardware Render Accelerator using a Modified Scanline Algorithm," Computer Graphics (Jul. 1992), vol. 26 No. 2, pp. 241–248. *1.

Maillot, Patrick–Gilles, "Three–Dimensional Homogeneous Clipping of Triangle Strips," Academic Press, Inc. (1991), pp. 219–231. *1.

Newell, M. E., et al., "A Solution to the Hidden Surface Problem," Proceedings of the ACM National Conference (1972), pp. 443–450. *1.

PHIGS Committee, Andries van Dam, Chairman, "PHIGS+ Functional Description, Revision 3.0," Computer Graphics (1988), vol. 22 No. 3, pp. 125–218. *1.

Pixar, "The RenderMan® Interface", Specification, Version 3.1 (Sep. 1989). *1.

Potmesil, Michael and Hoffert, Eric M., "FRAMES: Software Tools for Modeling, Rendering and Animation of 3D Scenes", Computer Graphics, (Jul. 1987), vol. 21, No. 4, pp. 85–93. *1.

Saito, Takafumi, et al., "Comprehensible Rendering of 3–D Shapes", Computer Graphics (Aug. 1990), vol. 24, No. 4, pp. 197–206. *1.

Segal, Mark, et al., "Fast Shadows and Lighting Effects Using Texture Mapping", Computer Graphics (Jul. 1992), pp. 249–252. *1.

Sillion, Francois, et al., "A General Two–Pass Method Integrating Specular and Diffuse Reflection", Computer Graphics, (Jul. 1989), vol. 23, No. 3, pp. 335–344. *1.

Snibbe, Scott S., et al., "Using Deformations to Explore 3D Widget Design", Computer Graphics, (Jul. 1992), vol. 26, No. 2, pp. 351–352. *1.

Strauss, Paul S., et al., "An Object–Oriented 3D Graphics Toolkit", Computer Graphics, (Jul. 1992), pp. 341–349. *1.

Tarlton, Mark A., et al., "A Framework for Dynamic Visual Applications," Proceedings of the 1992 Symposium on Interactive 3D Graphics (1992), pp. 161–164. *1.

Turkowski, Ken, "Design Considerations for an Object–Oriented [3D Graphics] Metafile," Proceedings of the Third Eurographics Workshop on Object–Oriented Graphics (Oct., 1992), pp. 163–169. *1.

Venolia, Dan, "Facile 3D Direct Manipulation", Proceedings of INTERCHI '93 (May 1993), pp. 31–35. *1.

Wanger, Leonard, "The Effect of Shadow Quality on the Perception of Spatial Relationships in Computer Generate Imagery", Proceedings of the 1992 Symposium on Interactive 3D Graphics (1992), pp. 39–42. *1.

Wernecke, Josie, "The Inventor Mentor—Programming Object–Oriented 3D Graphics with OpenInventor™, Release 2", Addison–Wesley Publishing Company (1994), pp. 3–77, 99–136, 211–249, 421–470 and 479–486. *1.

X Consortium, "PEX Protocol Specification", Version 5.2— Public Review Draft (15 Aug. 1994). *1.

5,777,621

QUALITY CONTROL MECHANISM FOR THREE-DIMENSIONAL GRAPHICS RENDERING

CROSS-REFERENCE TO RELATED APPLICATIONS

This application is a continuation-in-part of U.S. patent application SC/Ser. No. 08/362,118, filed Dec. 22, 1994, abandoned, entitled MECHANISM FOR IMPLEMENTING SCALABLE AND EXTENSIBLE GRAPHICS RENDERING, by inventor David Jevans, assigned to the assignee of the present application and incorporated herein by reference.

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

BACKGROUND

1. Field of the Invention

The invention relates to graphics rendering systems, and more particularly, to software tools for assisting graphics application developers.

2. Description of Related Art

Graphics rendering is the process of computing a two-dimensional image (or part of an image) from three-dimensional geometric forms. An object is considered herein to be three-dimensional if its points are specified with at least three coordinates each (whether or not the object has any thickness in all three dimensions). A renderer is a tool which performs graphics rendering operations in response to calls thereto. Some renderers are exclusively software, some are exclusively hardware, and some are implemented using a combination of both (e.g. software with hardware assist or acceleration). Renderers typically render scenes into a buffer which is subsequently output to the graphical output device, but it is possible for some renderers to write their two-dimensional output directly to the output device. A graphics rendering system (or subsystem), as used herein, refers to all of the levels of processing between an application program and a graphical output device. In many prior art systems, the graphics rendering system is coextensive with the renderer; that is, the renderer is called directly by the application program without any intervening layers of processing.

Graphics rendering systems typically feature an immediate mode interface or a retained mode interface to the application program. An immediate mode interface is a truly procedural interface in which the application program specifies each geometric primitive to the graphics rendering system every time the image is to be rendered. The rendering system does not maintain a model database from scene-to-scene, although the application program may do so. Immediate mode interfaces are highly attractive for rendering scenes where the model is changing at each frame, such as for visualization of simulations, previewing of animation sequences, or reading a series of models from a file. On the other hand, an immediate mode interface requires that the entire scene be transmitted via procedure calls to the renderer at each frame, resulting in high data bandwidth between application program and renderer. Also, the file format for a model is often simply a stream of drawing commands rather than the model itself, restricting its usefulness as a data interchange format. Immediate mode interfaces are also less conducive to providing toolkit modeling functionality to the application program, and they usually preclude a user interface toolkit that operates on objects in the scene.

In a retained mode system, sometimes called a display list system, the graphics rendering system maintains a database representation of the three dimensional model. At each frame, the rendering system traverses the retained model database and draws it. This can be instigated by a single call by the application program to the graphics rendering system, instead of a stream of drawing calls describing the entire scene. When the model changes, the application program edits or updates the model database and again asks the rendering system to render the scene. The benefits of a retained mode system include reduced bandwidth between the application program and any hardware accelerator. The file format of the model database also can be used easily as a data interchange format since it is not merely a list of procedure calls. The existence of an object database also provides an additional way of implementing a user interface toolkit and modeling functionality. Retained mode renderers can also cache rendering information and can also cache information for optimization of scene traversal. On the other hand, retained mode rendering systems have a higher overhead for editing the scene database, and they restrict application program design by forcing the scene into a system-defined data structure, usually a hierarchy, thus requiring many application programs to maintain a duplicate copy of the model in their own format.

In Mark A. Tarlton and P. Nong Tarlton, "A Framework for Dynamic Visual Applications," Proceedings of the 1992 Symposium on Interactive 3D Graphics, Cambridge, Mass., 1992, pp. 161–164, incorporated by reference herein, there is described a retained mode rendering system which implements a general purpose database system to organize the model rather than forcing the model to reside in a single system hierarchy. Such a technique attempts to provide the benefits of the retained mode system without the drawbacks.

The following list describes some of the graphics rendering systems which are currently available.

GL™. Silicon Graphics' GL is an immediate mode renderer used primarily for interactive graphics. GL is described in "Graphics Library Programming Guide," Silicon Graphics Computer Systems, 1991, incorporated by reference herein. It was designed as an interface to Silicon Graphics IRIS rendering hardware and does not provide a file format, hard copy output, modeling capability, or user interface tools. GL supports simple display lists which are essentially macros for a sequence of GL commands. The GL routines perform rendering operations by issuing commands to the IRIS hardware.

StarBase™. Hewlett-Packard's StarBase is an immediate mode system that is very similar to GL, sharing most of its features and disadvantages. StarBase is described in "Starbase Graphics Techniques, Hewlett-Packard Company," 1991, incorporated by reference herein. Numerous device drivers are available for StarBase for outputting the rendered (i.e. two-dimensional) scene on different graphics output devices ranging from plotters to high-end 3-D graphics work stations.

RenderMan™. RenderMan, by Pixar, is an immediate mode system designed primarily to support high quality rendering. RenderMan is described in Steve Upstill, "The RenderMan Companion," Addison-Wesley, Reading, Mass. 1990, incorporated by reference herein. As described in Tony Apodaca, "RenderMan Interface Specification Version 4.0 Beta," January, 1992, incorporated by reference herein, recent versions of the RenderMan specification provide new routines that bracket the existing RenderMan calls and allow different renderers to be used. The renderer is specified with a single call prior to rendering the scene, and it affects the entire scene. See also Pixar, "Quick RenderMan Interface and Implementation Specification," 1992, incorporated herein by reference.

PHIGS. PHIGS is described in PHIGS Committee, A. van Dam, chair, "PHIGS Functional Description, Revision 3.0," Computer Graphics, 22(3), 1988, pp. 125–218, incorporated by reference herein, and is a descendent of GKS-3D, described in International Standards Organization, "International Standard Information Processing Systems Computer Graphics—Graphical Kernel System for Three Dimensions (GKS-3D) Functional Description," ISO Document Number 8805: 1988(E), American National Standards Institute, New York, 1988, incorporated by reference herein. PHIGS was a committee-designed system for interactive 3-D graphics display. In PHIGS, the entire model database resides in a single hierarchy. Application programmers must learn a host of editing and hierarchy manipulation calls in order to effectively use the system. PHIGS employs a single renderer that supports all the rendering modes specified available in PHIGS, and does not support alternative renderers for photorealism or other effects.

PEX. PEX is an extension to the X-Windows system, defined by a serial protocol (for transmitting data between an application program and the X-Windows system) and a set of semantics which were originally derived from PHIGS. PEX has several available APIs, all of which support retained-mode, immediate-mode, and mixed-mode function calls for drawing, changing state, etc. PEX is described in "PEX Protocol Specification, Version 5.0P-X Public Review Draft," 14 Sep., 1990, Massachusetts Institute of Technology, incorporated by reference herein.

HOOPS™. HOOPS, by Ithaca Software, is described in Garry Wiegand and Bob Covey, "HOOPS Reference Manual, Version 3.0," Ithaca Software, 1991, incorporated by reference herein. It is a retained mode 3-D graphics system, which organizes the model in a hierarchy whose nodes are accessed through textual strings in much the same way that files in the UNIX file system are referenced. Like PHIGS, HOOPS supports a single renderer. However, HOOPS provides more extensive scene editing functionality than PHIGS.

DORÉ™. DORÉ, by Kubota, is an example of a 3-D graphics system with an object-oriented design. It is described in "Doré Programmer's Guide," Release 5.0, Kubota Pacific Computer Inc., 1991, incorporated by reference herein. DORÉ was designed so that scene data is renderable by many kinds of renderers, rather than a single monolithic renderer as provided by PHIGS. Renderers cannot be added dynamically to DORÉ, however, as the rendering methods are built into the system. In DORÉ, the choice of renderers is specified by setting the current rendering style in the DORÉ "view object". DORÉ then also requires the application program to attach the model to the view object before rendering. This restricts DORÉ to utilizing only one renderer at a time. There are other design considerations in DORÉ that also restrict it to using only one renderer at a time; for example, only one set of global variables is provided for maintaining the rendering state.

DORÉ is a retained mode system. To relieve much of the hassle associated with editing the model hierarchy and to facilitate dynamic databases and user interaction, DORÉ supports application callback objects, whereby an application program defines a function to be called when the callback object is encountered during scene traversal.

Inventor™. Inventor is an object oriented 3-D graphics user interaction toolkit that sits on top of the GL graphics system. Like DORÉ, Inventor supports multiple renderers by having a renderer-specific "render" method for each object type. Inventor is a retained mode system with the entire scene residing in a "scene graph". Inventor has render action objects that take a model as a parameter. The renderer is selected by the rendering action that is used when drawing the model. The render action draws the entire model by traversing the model and calling the appropriate rendering method for each object. The usual render action is the GL rendering mode. Inventor is described in Wernecke, "The Inventor Mentor", Addison-Wesley (1994), incorporated by reference herein.

Other references pertinent to the disclosure herein are the following, all incorporated by reference herein: Bergman, Fuchs, and Grant, "Image Rendering by Adaptive Refinement," Computer Graphics, 20(4), 1986, pp. 29–37; Catmull, "A Subdivision Algorithm for Computer Display of Curved Surfaces," Ph.D. Thesis, Report UTEC-CSc-74-133, Computer Science Department, University of Utah, Salt Lake City, Utah, December, 1974; Chen, Rushmeier, Miller, and Turner, "A Progressive Multi-Pass Method for Global Illumination," Computer Graphics, 25(4), 1991, pp. 165–174; Clark, "The Geometry Engine: A VLSI Geometry System for Graphics," Computer Graphics, 16(3), 1982, pp. 127–133; Foley, van Dam, Feiner, and Hughes, "Computer Graphics: Principles and Practice," Addison-Wesley, Reading, Mass., 1990; Haeberli and Akeley, "The Accumulation Buffer: Hardware Support for High-Quality Rendering," Computer Graphics, 24(4), 1990, pp. 309–318; Kelley, Winner, and Gould, "A Scalable Hardware Render Accelerator using a Modified Scanline Algorithm," Computer Graphics, 26(2), 1992, pp. 241–248; Maillot, "Three-Dimensional Homogeneous Clipping of Triangle Strips," Graphics Gems II, Academic Press, Inc., San Diego, Calif., 1991, pp. 219–231; Newell, Newell, and Sancha, "A Solution to the Hidden Surface Problem," Proceedings of the ACM National Conference, 1972, pp. 443–450; Potmesil and Hoffert, "FRAMES: Software Tools for Modeling, Rendering, and Animation of 3D Scenes," Computer Graphics, 21(4), 1987, pp. 85–93; Saito and Takahashi, "Comprehensible Rendering of 3-D Shapes," Computer Graphics, 24(4), 1990, pp. 197–206; Segal, Korobkin, van Widenfelt, Foran, and Haeberli, "Fast Shadows and Lighting Effects Using Texture Mapping," Computer Graphics, 26(2), 1992, pp. 249–252; Sillion and Puech, "A General Two-Pass Method Integrating Specular and Diffuse Reflection," Computer Graphics, 23(3), 1989, pp. 335–344; Snibbe, Herndon, Robbins, Conner, and van Dam, "Using Deformations to Explore 3D Widget Design," Computer Graphics, 26(2), 1992, pp. 351–352; Strauss and Carey, "An Object-Oriented 3D Graphics Toolkit," Computer Graphics, 26(2), 1992, pp. 341–349; Turkowski, "Design Considerations for an Object-Oriented [3D Graphics] Metafile," Proceedings of the Third Eurographics Workshop on Object-Oriented Graphics, Charnpery, Switzerland, October, 1992, pp. 163–169; Venolia, "Facile 3D Direct Manipulation," to appear in Proceedings of CHI '93, ACM/SIGCHI, Amsterdam, May, 1993; Venolia, "Automatic Alignment in Two and Three Dimensions," submitted to SIGGRAPH '93; and Wanger, "The Effect of Shadow Quality on the Perception of Spatial Relationships in Computer Generate Imagery," Proceedings of the 1992 Symposium on Interactive 3D Graphics, Cambridge, Mass., 1992, pp. 3942.

When a three-dimensional model is to be rendered into a scene for display, a classic trade-off exists between the speed of the rendering operation, on the one hand, and the quality of the result, on the other hand. For example, wire frame rendering operates at high speed, but produces a low-quality result, whereas a ray-tracer requires a much longer time period to render the same model, but can produce extremely high-quality results. Thus, an application program which permits interactive editing of a three-dimensional model may benefit by using a wire frame renderer to draw intermediate versions on a display, and by using a ray-tracer renderer to draw the final version for output. However, the interchangeability of renderers is awkward at best using the rendering systems described above. Moreover, substitution of one renderer for another provides only gross control over the speed/quality trade-off continuum. It would be desirable to permit an application program to sacrifice a little quality in order to gain a little speed, or vice versa. It would be desirable to provide a plurality of gradations on the speed/quality trade-off continuum so that a user or application program may select exactly the desired position in the tradeoff.

In the past, application programs have provided users with control over various incidental parameters of the rendering process, and users have taken advantage of this control by selecting options which, as a side effect, affect the speed/quality trade-off. For example, by temporarily turning off certain lights, a user can hasten the rendering process at the expense of quality. The same effect can be accomplished by culling objects from the scene before rendering, by making the output window smaller, by switching from filled mode to edge mode for a renderer that allows such selection, and by setting a coarser antialiasing level. In some systems, several of the parameters which affect the speed/quality trade-off are made accessible to the user in a single dialog box, in which the user can select an option for each of the controllable parameters. This is a highly piecemeal approach to the problem. Other application programs do allow a user to select a gross quality for rendering, but usually the user's selection causes the program to call a completely different renderer, or at least causes the renderer to use grossly different rendering methods.

Accordingly, there is a need for a quality control mechanism which allows an application program or user to select a desired point in the overall speed/quality rendering trade-off, with relatively fine resolution on the continuum, and without being concerned with individual rendering parameters.

SUMMARY OF THE INVENTION

It is therefore an object of the present invention to provide a mechanism which allows an application program or user to select a desired point in the overall speed/quality rendering trade-off, with relatively fine resolution on the continuum, and without being concerned with individual rendering parameters.

According to the invention, roughly described, a graphics rendering system includes a continuum, or collection, of quality control data groups, each of which contains a plurality of quality control type variables. Each of the type variables contains a value which selects among a plurality of options in a respective trade-off between rendering quality and rendering speed. For example, each of the quality control data groups may include a quality control type variable for "level of detail"; those groups at the lower end of the quality continuum may have those variables set to "low", whereas data groups at the higher end of the continuum may have this variable set to "high".

In an aspect of the invention, each of the quality control data groups is associated with a respective quality index. Thus, an application program can select a point on the overall rendering speed/quality rendering trade-off, merely by selecting a quality control index value. Moreover, the application program can make the quality control index accessible to a user, for example in such an intuitive form as an iconic "quality knob". The quality knob may have a number of settings, for example, ranging from 0.0 to 1.0, each of which corresponds to a respective one of the quality control data groups. Thus the mechanism permits the user to have fine control over the rendering speed/quality rendering trade-off, without being concerned with adjustments to the individual rendering parameters.

BRIEF DESCRIPTION OF THE DRAWINGS

The invention will be described with respect to particular embodiments thereof and reference will be made to the drawings, in which.

DETAILED DESCRIPTION

Figure 1:
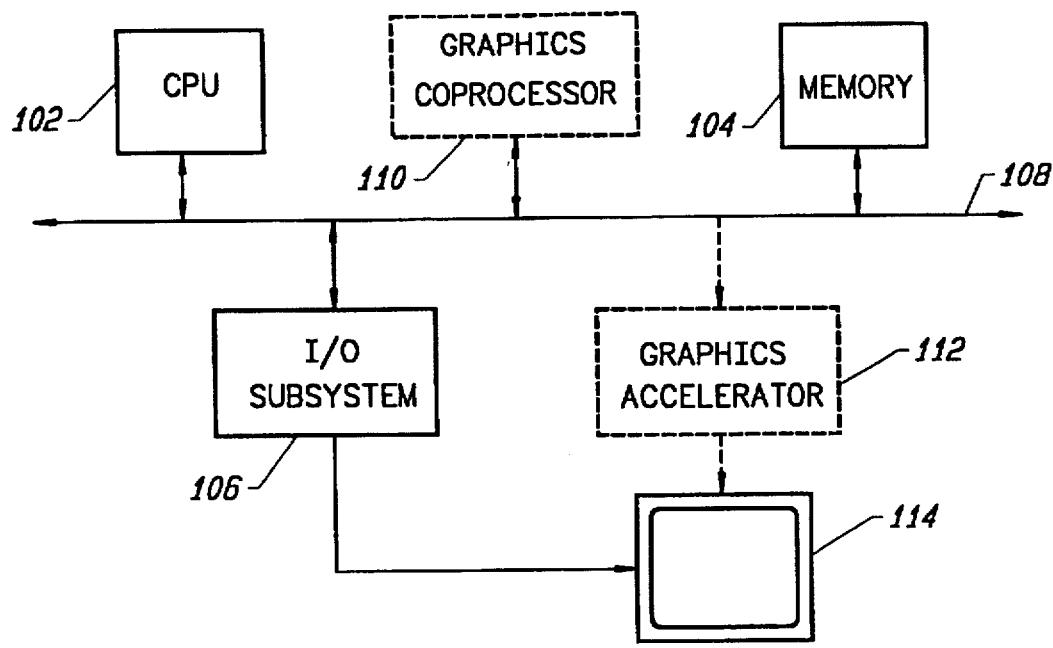
FIG. 1 is a simplified block diagram of a computer system implementing the present invention.

FIG. 1 is a simplified block diagram of a computer system implementing the present invention. Although certain types of computer architectures might take better advantage of the invention than others, the invention can be implemented on virtually any type of architecture. In the architecture of FIG. 1, a CPU 102, a memory 104, and an I/O subsystem 106 are all connected to a bus 108. The CPU 102 issues signals over the bus 108 for reading and writing to the memory 104 or to the I/O subsystem 106, in order to manipulate data in the manner described herein. The CPU issues such signals in response to software instructions that it obtains from the memory 104. The I/O subsystem 106 may also be capable of issuing signals over the bus 108 in order to access memory 104 in a particular embodiment. The system can also include a graphics coprocessor 110, which can offload from the CPU 102 many of the memory-intensive tasks required for rendering an image. In such situations, the display, illustrated in FIG. 1 as 114, is often driven by the I/O subsystem 106. In other systems, a graphics accelerator 112 is connected to the bus 108 and to the display 114. In these systems, the display buffer is typically held inside the graphics accelerator 112 which can not only write specific attributes (e.g. colors) to specific pixels of the display 114 as requested by CPU 102, but can also draw more complicated primitives on the display 114 under the command of CPU 102.

The invention is implemented in the present embodiment in the form of a set of software tools referred to herein as Escher. These software tools include a set of software procedures and a set of header files which define the variable names and data structures used by the procedures. Escher is provided to an application program developer on a storage medium such as a magnetic or optical disk or disks. In one embodiment, the storage medium contains source code for Escher, while in another embodiment, the storage medium contains compiled object code for Escher. In yet another embodiment, the storage medium contains some source code and some object code for Escher. The application developer compiles an application program with Escher and with one or more renderers and stores the resulting object code on a storage medium. The combined object code is later read into memory 104, either entirely or in an overlaid manner, and executed by the CPU 102.

It should be noted that software and data referred to herein as being in "memory", could at any given time actually reside, entirely or in part, in a secondary storage medium such as a disk. This situation could arise due to such architectures as overlaid execution, or virtual memory, for example. For simplicity, all such software and data is considered herein to reside "in memory" at all pertinent times, even though it may at some times actually reside temporarily elsewhere.

Figure 2:
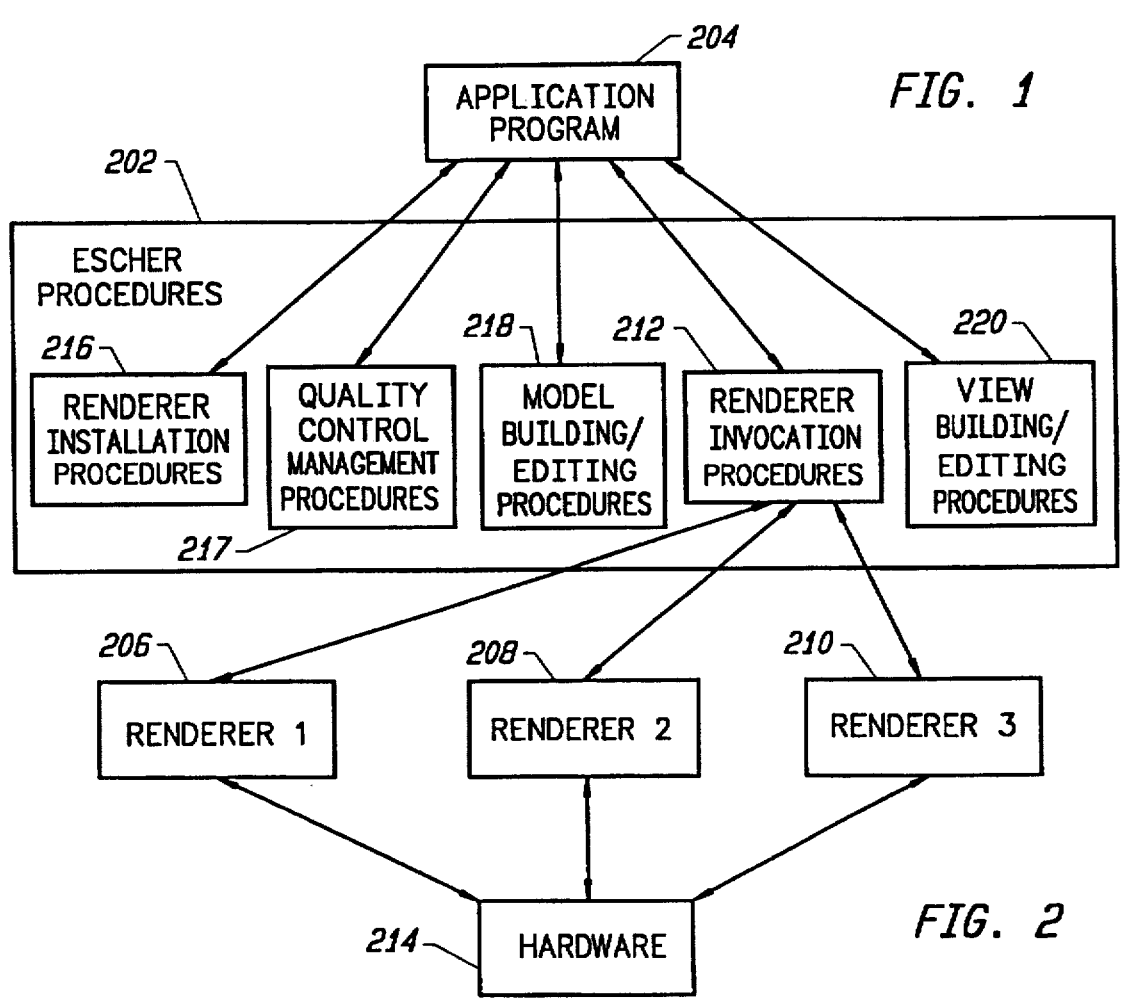
FIG. 2 illustrates a software architecture employing the invention.

FIG. 2 illustrates the logical position of Escher in a software architecture. As can be seen, logically, the Escher procedures 202 are disposed between an application program 204 and a plurality of renderers 206, 208 and 210. That is, the application program 204 makes procedure calls to Escher procedures via an application program interface (API), and certain procedures within Escher (specifically, certain renderer invocation procedures 212) make procedure calls to the renderers 206, 208 and 210. The application program 204, when making calls to the renderer invocation procedures 212, specifies which renderer the renderer invocation procedures should use. The renderers, in turn, communicate with other hardware components 214 of the platform, such as a display buffer memory, a graphics coprocessor 110 if present, and/or a graphics accelerator 112, if present. The Escher procedures, in addition to the renderer invocation procedures 212, also include renderer installation procedures 216, quality control management procedures 217, model building and editing procedures 218, view building and editing procedures 220, and several other kinds of procedures (not shown) which are not pertinent to an understanding of the invention.

Figure 3:
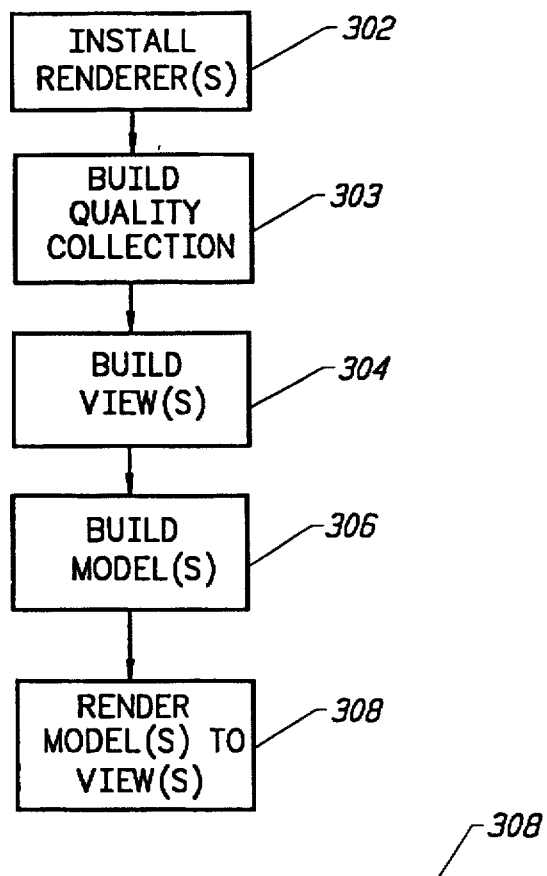
FIG. 3 is a flowchart illustrating the overall flow of a program using the invention.

FIG. 3 is a flowchart illustrating the overall flow of an example program which uses the invention. In a step 302, the application program 204 calls an Escher initialization procedure (not shown) which, among other things, installs one or more renderers using the renderer installation procedures 216. One of the advantages of Escher is that a variety of different kinds of renderers can be installed, including renderers which were not available at the time the application program was compiled.

In a step 303, the application program calls the quality control management procedures 217 of Escher in order to build one or more "quality collection objects", each of which can contain one or more "quality group objects". A quality group object is an object created by the Escher system according to a predefined data structure, which collects in one place a number of quality control criteria such as line style, type of shaders, type of illumination, level of detail, antialiasing level, and so on.

In a step 304, the application program calls the view-building/editing procedures 220 of Escher in order to build one or more "view objects". A view object is an object created by the Escher system according to a predefined data structure, which collects in one place a number of viewing criteria such as a camera position, illumination, a hardware destination ("draw context") into which a two-dimensional image is to be rendered, as well as a choice of renderers, among other things. Step 304 can also include a call to an Escher procedure to select a quality group for use in the rendering process.

In a step 306, the application program makes calls to the model-building/editing procedures 218 of Escher, in order to build one or more models. A model is represented in Escher as a hierarchy of one or more objects, each of which describes a geometry (shape), a material attribute (describing the appearance of a surface), a style (such as filled surfaces, edges only or points only), a transform (describing the relative position, orientation and size of three-dimensional objects with respect to world space), or a group (which merely contains further objects at the next level down in the hierarchy). As the term is used herein, a "model" can constitute only a single object, such as a geometry object, without any hierarchically-defined sub-objects.

In a step 308, the application program calls the renderer invocation procedures 212 in order to have Escher render one or more of the models created by the application program, to one or more of the views defined by the application program. The API for the rendered invocation procedures 212 includes both immediate-mode calls as well as retained-mode calls. For immediate-mode calls, the application program passes in only non-hierarchical data structures to render. The Escher system passes the structures immediately to the specified renderer, without caching any intermediate results. For material, style and transform objects, the Escher system merely adjusts the current "state" of the view, thereby affecting the rendering of subsequently received geometries. For retained-mode calls to the renderer invocation procedures 212, the object passed by the application program 204 can be an entire hierarchically defined model; the renderer invocation procedures 212 automatically traverse this model, making appropriate calls to the specified renderer at appropriate points in the traversal.

In both immediate-mode calls and retained-mode calls, the application program 204 specifies to the renderer invocation procedures 212 both the object to render and a view object. The current "state" of rendering is always maintained within the data structure of the view object, so the application program can render the same model to more than one view at the same time merely by interspersing calls which specify one view object and calls that specify another view object. These calls will not interfere with each other (unless, of course, both view objects designate the same draw context). The two view objects could specify the same or different renderers, and the draw context specified in the view objects can be for output to the same or different kinds of output devices (such as two different windows on a single display, or one for a display and one for a printer). Moreover, the application program 204 can intermix immediate-mode calls and retained-mode calls for the same view, thereby allowing the application developer to optimize the storage and/or traversal of different parts of a scene differently.

Figure 4:
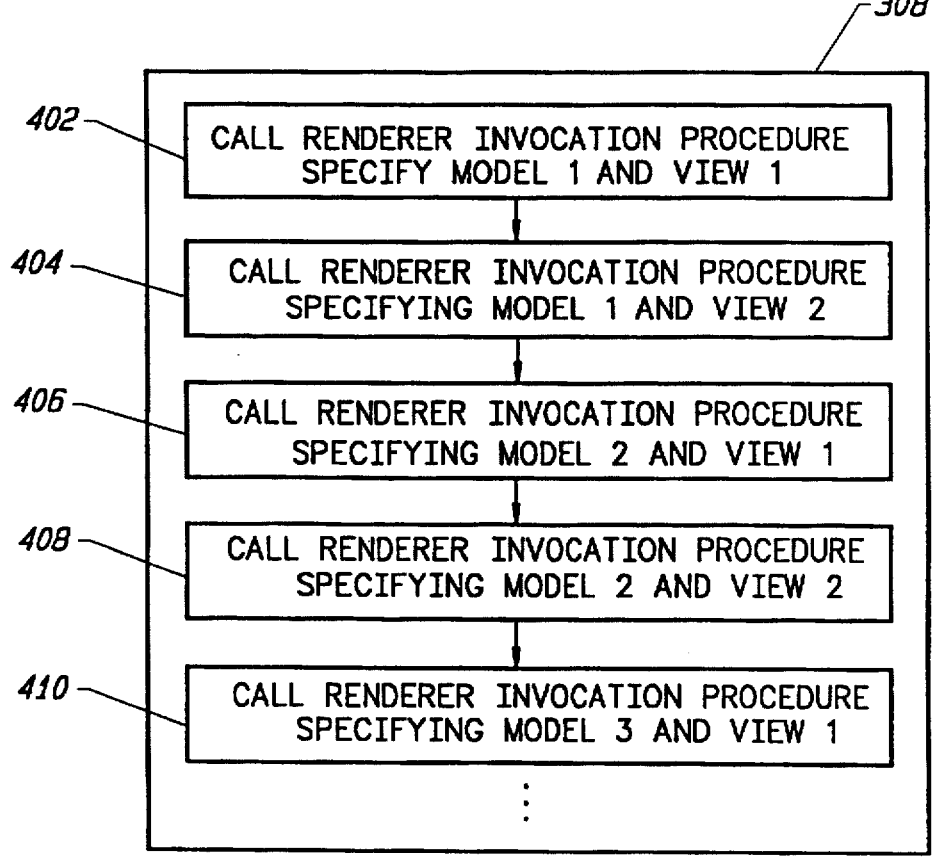
FIG. 4 is a detail of step 308 in FIG. 3.

Some of these possibilities are illustrated in an example flowchart shown in FIG. 4. In a step 402, the application program calls the renderer invocation procedures 212 specifying a first model and a first view object. In a step 404, the application program calls the renderer invocation procedures specifying the first model and a second view object. In a step 406, the application program calls the renderer invocation procedures specifying a second model and the first view object. In a step 408, the application program calls the renderer invocation procedures specifying the second model and the second view object. In a step 410, the application program calls the renderer invocation procedures specifying a third model and the first view object, and so on.

The independence of an Escher view object (including identification of renderer) from the model to be rendered, also provides enormous flexibility in the sequence of operations performed by the application program 204. For example, renderers need not be installed (step 302) until just prior the calls to the renderer invocation procedures 212 (step 308). View objects also do not need to be defined or completed (step 304) until after a model is prepared (step 306). Thus an application program might build a model, or part of a model, and allow a user to select a renderer only afterwards. Choice of renderer can be made using, for example, a pop-up browse window which offers a number of already installed renderers, and which also offers the user an ability to install yet another renderer at that time. The application program can then render the model (or models) using the chosen renderer, subsequently edit the model or build new ones, and/or change the choice of renderers, and render the model(s) again, and so on. Such flexibility is made possible because the choice of renderer is not bound up in the model as it is being built, but rather, the application program specifies the renderer in its calls to the renderer invocation procedures 212 of Escher.

A simple C-language application program 204 is set forth in Appendix A hereto. In this example, the program first calls the Escher initialization routine, which installs both a wire frame renderer and a Z-buffer renderer. Next, an application routine ExSetupQualityCollection() is called to set up and initialize a quality collection object. This procedure is described in more detail hereinafter.

Next, a view object ("view") is created and a particular renderer (the wire frame renderer) is associated with the view. A camera object and a draw context object are also associated with the view object. The program then creates a model ("group") and adds in a polygon object ("polygon"), a line object ("line"), a transform object ("transform") and a group object ("subGroup"). The application program then adds torus object ("torus", a form of geometry object), to the group object. Next, a user-specified quality index is established for the view object and the model is traversed and rendered using the renderer specified in the view object. The renderer specified in the view object is then changed to the Z-buffer type renderer, and the same model is rendered again using the renderer specified in the view object.

Before continuing, it will be worthwhile to set forth certain naming conventions used in the C-language source code incorporated into the present description. In this description, names that begin with the prefix Et (Escher type) are data types defined in the Escher source code. Names that begin with the prefix Ec (Escher constant) are constants defined in the Escher source code. Names that begin with the prefix Er (Escher routine) are procedure names which are callable by the application program. Names beginning with the prefix Ei (Escher internal) are names of internal Escher procedures which are called only by other Escher procedures. Many of these have counterpart Er procedures which are called by the application program, and which essentially do nothing more than call the corresponding Ei procedure. For this reason, Er and Ei procedure names are used interchangeably herein. Finally, names having the prefix Eg (Escher global) are global variables.

The names of Escher routines begin with Ei or Er, and are followed by subwords which begin with capital letters. The form of most Escher procedure names as used herein is ErFoo_DoSomething, where Foo is the type of data that the function is to operate on and DoSomething is the operation which the routine is to perform on that kind of data. For example, a procedure to create a new polygon object is named ErPolygon_New. Other naming conventions will be mentioned as they arise.

The different primary steps of an application program, as illustrated in FIG. 3, will now be described in more detail.

I. RENDERER INSTALLATION

The installation of renderers for Escher uses a generalized extension mechanism which is also used for installing other extensions such as shaders. Extensions for Macintosh implementations are files, stored in mass storage in the hardware of FIG. 1, with a data fork and a resource fork. The data fork contains the code to be loaded by the Escher system, and the resource fork identifies the code fragments in the data fork.

When an application program 204 operating on a Macintosh makes a call to the Escher procedure ErInitialize(), the Escher system looks for all extension files in an extension folder on the computer system. All files that are found and that contain appropriate resource information are then considered available for use by the application program. The extension file specifies an initialization routine, which takes all the necessary steps to "register" the services that it provides with the Escher system, as well as a termination routine.

Escher extensions are loaded into a generalized object hierarchy in the Escher runtime environment. Escher's object hierarchy has an "open" architecture which allows any application to "plug in" a subclass at any of several levels in the hierarchy. Renderers are one of the object classes that may be subclassed.

A. Escher Object System

Figure 5:
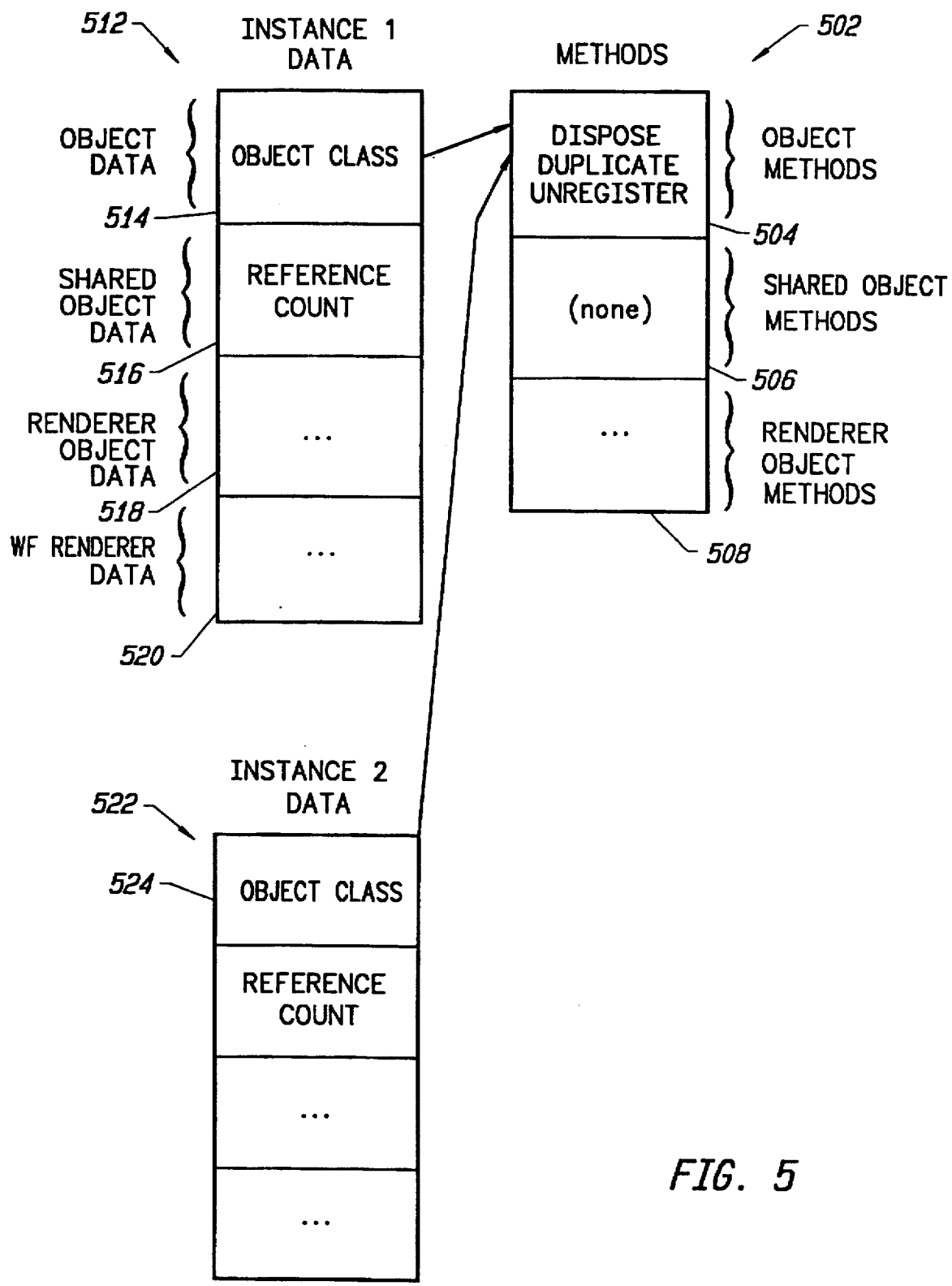
FIGS. 5, 7, 9, 11 and 12 illustrate object data structures in memory.

An object in the Escher system is identified by two handles, namely an object class and an object type. The object class is a pointer of type EtObjectClassPrivate, and the object type is a longword. Because the parent class of each subclass in the Escher class hierarchy provides a certain behavior, Escher stores object private data and object classes in a layered manner. For example, a subclass of the renderer class is abstractly laid out in the manner illustrated in FIG. 5. FIG. 5 shows an object "class" 502, which is a contiguous region of memory containing pointers to all the methods associated with the renderer, in this case a wire frame (WF) renderer. Since the wire frame renderer is subclassed from the renderer class, the renderer class is subclassed from a "shared object" class, and the "shared object" class is subclassed from the generalized "object" class, the method tables 502 first list the methods associated with the object class (region 504). These methods include dispose object, duplicate object and unregister object, among other things. All object class method tables point to the same set of Escher procedures in these entries, unless these entries have been overridden on initialization by one of the descendant classes represented in a particular method table 502. The class 502 next contains a region 506, containing pointers to a set of methods appropriate for all objects in a "shared object" class. As it happens, there are no "shared object" methods, so no space is allocated in this layer. The region 506 is followed by a region 508 containing pointers to a set of methods appropriate for all renderers. There is no layer specifically for the wire frame renderer class because, by convention in the Escher design, leaf classes have no method tables of their own.

Region 512 stores all of the data for an instance of class 502. This region is organized in the same manner as region 502. Specifically, it contains first all of the data which is appropriate to any instance of an object class in region 514, followed by all the data appropriate for any instance of a shared object class in region 516, followed by all the data appropriate for any instance of a renderer object in region 518. Unlike the class data 502, the instance data 512 also contains a region 520 containing all the data appropriate for an instance of a wire frame renderer object. The object data in region 514 contains merely a pointer to the method tables 502, which are common for all instances of wire frame renderer objects. The shared object data in region 516 contains a reference count, and the renderer object data in region 518 and the wire frame renderer data in region 520 are described hereinafter.

Also shown in FIG. 5 for illustrative purposes is a second instance of an object in the wire frame renderer class. The second instance has all its data contained in region 522, in the same format as the data of the first instance in region 512. The object data in region 524 of this data points to the same object class method table 502 as does the object data for the first instance. Note that the second instance in FIG. 5 is provided only to illustrate the relationship between classes and instance data in Escher's object mechanism. It is unlikely that more than one instance of a wire frame renderer in particular would ever coexist in a single instantiation of an application program, but this is not precluded.

Figure 6:
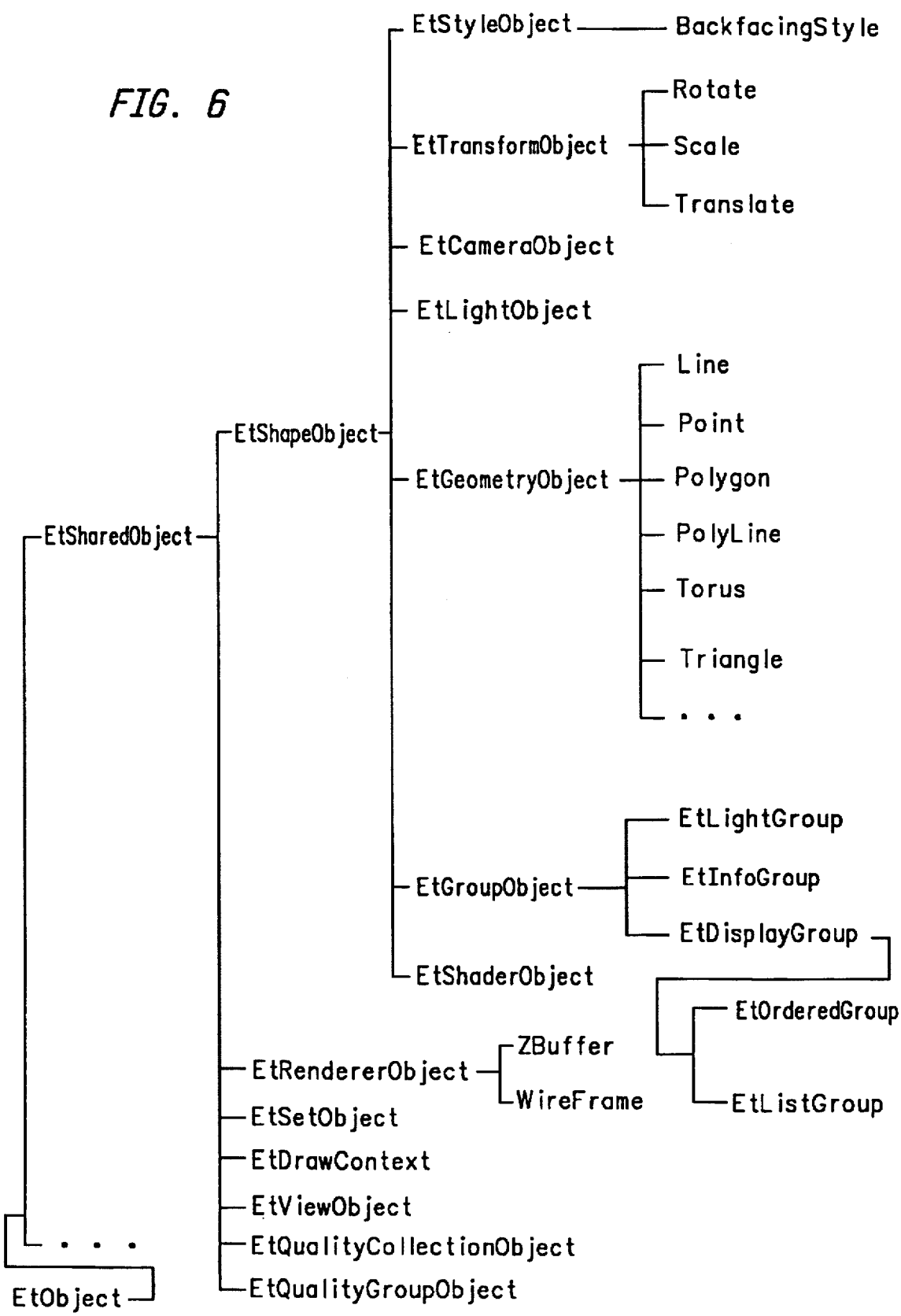
FIG. 6 illustrates a class hierarchy used in an embodiment of the invention.

At this time, it will be useful to describe the class hierarchy used in the Escher system. This hierarchy is extensive, and only those classes which are pertinent to an understanding of the invention are illustrated in FIG. 6. Referring to FIG. 6, it can be seen that the EtObject class is the parent class to all classes in the hierarchy. The EtSharedObject class is subclassed under EtObject, as are other classes not here pertinent. Subclassed under the EtSharedObject class is an EtShapeObject class, an EtRendererObject class, an EtSetObject class, an EtDrawContext class, an EtViewObject class, an EtQualityCollection Object class and an EtQualityGroupObject class. Subclassed under the EtShapeObject class are an EtStyleObject class, an EtTransformObject class, an EtCameraObject class, an EtLightObject class, an EtGeometryObject class, an EtGroupObject class, and an EtShaderObject class, and subclassed under the EtRendererObject class are a ZBuffer class and a WireFrame class. Subclassed under the EtStyleObject class is a BackfacingStyle class, among others. Subclassed under the EtTransformObject class are a Rotate class, a Scale class and a Translate class, among others not shown. Subclassed under the EtGeometryObject class are classes for Line, Point, Polygon, PolyLine, Torus and Triangle objects, among others. Subclassed under the EtGroupObject class are an EtLightGroup class, an EtInfoGroup class and an EtDisplayGroup class, the last of which has subclasses EtOrderedGroup and EtListGroup. This class hierarchy describes the storage of method tables and instance data for each of the classes included in the hierarchy. The classes at the ends of the hierarchy (i.e. the "leaves" of the tree structures) are known as "leaf" classes.

B. Registering a Renderer

The basis for object subclassing in Escher is that Escher builds its method tables dynamically at system start-up time using an extensions mechanism. Every object class in the system, including renderer object classes, is "registered" under the control of the ErInitialize procedure called by the application program so that their functionality is available when required. As each extension is loaded, Escher obtains the address of the extension's initialization function from the resource fork of the extension file. It then invokes that function.

The following is a C-language initialization procedure, called ErWF_Register, used by the wire frame renderer extension.

---

```
Copyright © 1994 Apple Computer, Inc.
EtStatus ErWF_Register(
    void)
{
EgWFRendererClass = ErRendererClass_Register
        (EcRendererType_WireFrame,
        "WireFrame",
        ErWF_MetaHandler);
if (EgWFRendererClass == NULL) {
    return (EcFailure);
}
ErRendererClass_OverrideGeometryTypeDrawMethod
        (EgWFRendererClass,
        EcGeometryType_Polygon,
        ErWF_Geometry_Polygon);
ErRendererClass_OverrideGeometryTypeDrawMethod
        (EgWFRendererClass,
        EcGeometryType_Triangle,
        ErWF_Geometry_Polygon);
ErRendererClass_OverrideGeometryTypeDrawMethod
        (EgWFRendererClass,
        EcGeometryType_PolyLine,
        ErWF_Geometry_PolyLine);
ErRendererClass_OverrideGeometryTypeDrawMethod
        (EgWFRendererClass,
        EcGeometryType_Line,
        ErWF_Geometry_PolyLine);
ErRendererClass_OverrideGeometryTypeDrawMethod
        (EgWFRendererClass,
        ErWF_GeometryType_Point);
        ErWR_Geometry_Point;
ErRendererClass_OverrideGeometryTypeDrawMethod
        (EgWFRendererClass,
        EcGeometryType_Marker,
        ErWF_Geometry_Marker);
ErRendererClass_OverrideGeometryTypeDrawMethod
        (EgWFRendererClass,
        EcGeometryType_Decomposition,
        ErWF_Geometry_Decomposition);
/* Track transforms and attributes */
ErRendererClass_OverrideTransformTypeChangeMethod(
        EgWFRendererClass,
        EcViewStateType_Transform_LocalToWorldMatrix,
        ErWF_UpdateTransformations);
ErRendererClass_OverrideAttributeSetChangedMethod(
        EgWFRendererClass,
        ErWF_UpdateAttributeSet);
return (Ecsuccess);
}
```

---

When a class is registered, it supplies methods which determine the behavior of instances of the class. The class supplies these methods to Escher via a metahandler. A metahandler is a function which maps Escher method types to function pointers. Escher asks the metahandler function to give it a method of a certain type, and if the metahandler knows the method type, it returns its corresponding method. If the metahandler does not know the method type being asked for, it returns NULL. As can be seen, the first step of ErWF_Register registers the new wire frame subclass by calling the renderer class's registration method ErRendererClass_Register procedure with an identification of the wire frame renderer's metahandler, ErWF_MetaHandler, as an argument. The wire frame renderer's metahandler is as follows:

```
Copyright ® 1994 Apple Computer, Inc.
static EtFunctionPointer ErWF_MetaHandler(
    EtMethodType    methodType)
}
    switch (methodType) {
        case EcMethodType_NewRenderer:
            return (EtFunctionPointer) ErWF_New;
        case EcMethodType_StartRenderer:
            return (EtFunctionPointer) ErWF_Start;
        case ECMethodType_EndRenderer:
            return (EtFunctionPointer) ErWF_End;
        case EcMethodType_CancelRenderer:
            return (EtFunctionPointer) ErWF_Cancel;
        case EcMethodType_ObjectDelete:
            return (EtFunctionPointer) ErWF_Delete;
        case EcMethodType_ObjectRead:
            return (EtFunctionPointer) EiWF_Read;
        case EcMethodType_ObjectAttach:
            return (EtFunctionPointer) EiWF_Attach;
        case EcMethodType_ObjectTraverse:
            return (EtFunctionPointer) EiWF_Traverse;
        case EcMethodType_ObjectWrite:
            return (EtFunctionPointer) EiWF_Write;
        default:
            return NULL;
    }
}
```

Escher will call the metahandler once for each entry in its method table, each time requesting the identification of a different wire frame method.

The EtRendererObject class includes a method table for rendering geometric shapes. Every renderer must provide a method to render at least three basic geometry types: point, line and triangle. The renderer can provide methods for rendering more complex geometry types as well. Thus, after registering a metahandler, the wire frame ErWF_Register procedure above calls the renderer class procedure ErRendererClass_OverrideGeometryTypeDrawMethod to establish the geometry draw methods that it supports. As can be seen the wire frame renderer registers procedures for rendering geometries of type polygon, triangle, line, polyline (sequence of connected lines) and points, among others.

The ErWF_Register procedure also overrides certain transform methods and attribute set methods in a method table of the renderer class.

It can be seen that through the object mechanism of Escher, new renderers can be installed at runtime into the Escher system merely by having them subclass themselves under the EtRendererObject class.

II. BUILDING A VIEW OBJECT

A. Data Structures

Figure 7:
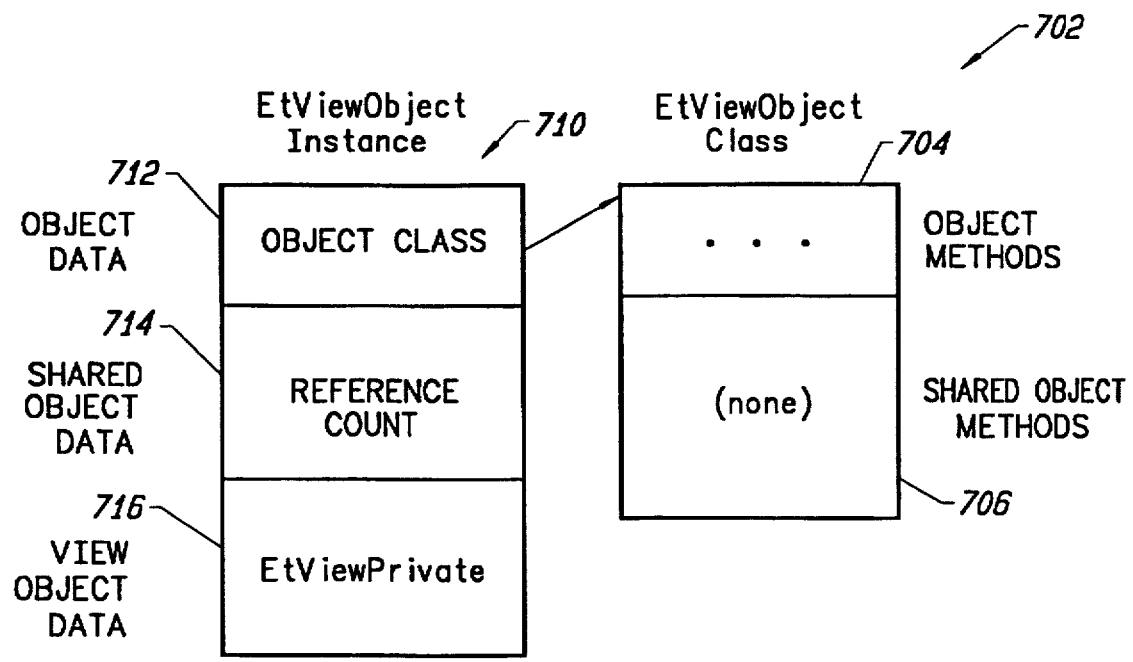

As mentioned, a view object is a data structure which contains, among other things, camera information, lighting information, traverser or state information as well as an indication of a choice of renderers. A view object is an instance of the class EtViewObject which, as indicated in FIG. 6, is a subclass of the class EtSharedObject, which is itself a subclass under the class EtObject. Accordingly, following the format of FIG. 5, a view object has the format of FIG. 7 in memory. Specifically, a region of memory 702 is allocated to contain pointers to the methods of EtViewObject class, and this region 702 contains pointers 704 to object methods and pointers 706 to shared object methods. The EtViewObject class is a leaf class, so in accordance with the Escher convention, the class omits a method table specifically for view object methods. Note also that in the present embodiment, there are no shared object methods either.

The structure also includes instance data for the view object in region 710 of memory. This region contains instance data specific to the object class in a portion 712 (pointing to the object class 702), instance data specific to the shared object class in a portion 714 (containing a reference count), and instance data specific to the view object class in a portion 716. The view object data is a data structure of type EtViewPrivate which is set out below.

```
Copyright ® 1994 Apple Computer, Inc.
typedef struct EtViewPrivate {
    /*
     * Flags
     */
    unsigned int         started : 1;
    unsigned int         cancelRendering: 1;
    unsigned int         viewOwnsRenderer: 1;
    long                 immediateMode;
    unsigned long        passNumber;
    /*
     * Objects that make up the view
     */
    EtRendererobject     rendererObject;
    EtRendererObject     saveRestoreRendererObject;
    struct EtRendererPrivate  *renderer;
    struct EtRendererClass    *rendererClass;
    EtQualityGroupObject quality;
    EtDrawContextObject  drawContext;
    EtCameraObject       camera;
    EtGroupObject        lights;
    EtShaderObject       atmosphericShader;
    EtshaderObject       backgroundShader;
    EtShaderObject       foregroundShader;
    EtAttributeSet       defaultAttributeSet;
    EtIdlerCallback      idlerCallback;
    void                 *idlerData;
} EtViewPrivate;
```

As can be seen, a view object includes, among other things, a pointer (*rendererClass) to the methods of a current chosen renderer, a pointer (*renderer) to the instance data of the current renderer, a draw context object, a camera object, lighting objects (lights), several shader objects, and a quality group object.

The EtRendererPrivate structure is defined as follows:

```
Copyright ® 1994 Apple Computer, Inc.
typedef struct EtRendererPrivate {
    EtViewObject                   view;
    struct EtAttributeState        *state;
    struct EtViewGroupsPrivate     *groups;
    struct EtRendererShadersPrivate *shaders;
    struct EtRendererAttributeSetPrivate *attributeSet;
    struct EtRendererStylesPrivate *styles;
    struct EtRendererTransformsPrivate *transforms;
    struct EtViewStudiosPrivate    *studios;
} EtRendererPrivate;
```

This structure contains pointers to a series of stacks which indicate the current state of a traversal. As described in more detail below, these state stacks a repushed each time Escher's traverser opens a "group" object in a model and begins traversing the next level of the hierarchy. These stacks are popped up to the prior state when the traverser completes its work at all lower levels of the model hierarchy and closes a "group" object.

The EtRendererClass data structure is defined as follows:

```
Copyright © 1994 Apple Computer, Inc.
typedef struct EtRendererClass {
    EtRendererInfo                           rendererInfo;
    EtRendererNewMethod                      newRenderer;
    EtRendererStartMethod                    startRenderer;
    EtRendererEndMethod                      endRenderer;
    EtRendererCancelMethod                   cancelRenderer;
    EtRendererSyncMethod                     syncRenderer;
    EtRendererPushMethod                     pushRenderer;
    EtRendererPopMethod                      popRenderer;
    EtRendererIsBoundingBoxVisibleMethod     isBBoxVisible;
    EtRendererTraceRayMethod                 traceRay;
    EtRendererStartCacheMethod               startRenderingCache;
    EtRendererIsCacheValidMethod             isRenderingCacheValid;
    EtRendererClearCacheMethod               clearRenderingCache;
    EtMethodTable                            *geometryDrawMethods;
    EtMethodTable                            *geometryPickMethods;
    EtMethodTable                            *shaderDrawMethods;
    EtMethodTable                            *shaderGetMethods;
    EtMethodTable                            *shaderChangeMethods;
    EtMethodTable                            *studioDrawMethods;
    EtMethodTable                            *studioGetMethods;
    EtMethodTable                            *styleDrawMethods;
    EtMethodTable                            *styleGetMethods;
    EtMethodTable                            *styleChangedMethods;
    EtMethodTable                            *transformDrawMethods;
    EtMethodTable                            *transformGetMethods;
    EtMethodTable                            *transformChangedMethods;
    EtMethodTable                            *groupMethods;
    EtRendererGeometryDrawMethod             geometryDrawMethod;
    EtRendererShaderDrawMethod               shaderDrawMethod;
    EtRendererStyleDrawMethod                styleDrawMethod;
    EtRendererTransformDrawMethod            transformDrawMethod;
    EtRendererAttributeSetDrawMethod         attributeSetDrawMethod;
    EtRendererAttributeSetGetMethod          attributeSetGetMethod;
    EtRendererAttributeSetChangeMethod       attributeSetChangedMethod;
    EtRendererAttributeDrawMethod            attributeDrawMethod;
    EtRendererAttributeGetMethod             attributeGetMethod;
} EtRendererClass;
```

It will be recalled that the initialization procedure of the wire frame renderer set forth above establishes a metahandler which Escher can call to override certain methods of the renderer class. Escher places the pointers returned by the metahandler in the EtRendererClass structure fields defined above for the corresponding methods. It will also be recalled that the wire frame renderer initialization procedure overrides some methods, in particular certain geometry drawing methods, using a ErRendererClass_OverrideGeometryTypeDrawMethod procedure. This procedure writes the pointer to the specified renderer procedure into the method table pointed to by *geometryDrawMethods, thereby overriding default methods set up by the Escher system originally on initialization. The EtMethodTable data structure is merely a list of pointers; for *geometryDrawMethods, each entry in the table points to the procedure for rendering a corresponding geometry type, for example point, line, triangle, etc. The correspondence between locations in this table and geometry types is fixed at compile time.

One other field in the EtRendererClass data structure which bears mentioning is the geometryDrawMethod field. This field contains a pointer a procedure which Escher will call if it has been asked to draw a geometry type which the current renderer does not support (i.e. the method table entry in *geometryDrawMethods for the geometry is NULL). That procedure decomposes the specified geometry into similar geometries as described in more detail hereinafter. In the present embodiment, the decomposition procedure cannot be overridden. In another embodiment of the invention, however, a renderer can override this decomposition method in order to optimize the process.

The EtQualityGroupObject structure is described hereinafter.

B. Procedures

The process of building a view object in step 304 (FIG. 3) is basically the process of writing desired information into the view object data structure. The example application program in Appendix A will be used to illustrate the process.

1. Creating a View Object

After initialization and establishment of a quality collection, the application program creates a new view object by calling view=ErView__New(). This procedure merely creates a new instance of an object in the EtViewObject class and fills it with default data.

2. Setting the Renderer

A renderer can be attached to a view object by calling an Escher procedure ErView__SetRenderer and passing in the view object and the renderer object. This call will increment the reference count of the renderer passed in. If a renderer object is already set, its reference count is decremented.

A renderer can also be set by renderer type without first having to obtain an instance of a renderer object. In this case, the application program calls the Escher routine ErView__SetRendererByType, and this is the procedure which is called by the example program in Appendix A. The parameters passed to this procedure are the view object and a type designation, which is a four-character code designating a type of renderer (for example, wire frame or Z-buffer). The Escher procedure ErView__SetRendererByType determines what renderer has been registered of the type specified and if such a renderer has been registered, writes a pointer to the renderer instance data into the appropriate entry of the specified view object.

3. Setting the Camera

Before setting the camera, a camera object must be created and initialized. The example program in Appendix A accomplishes this by writing the camera perspective data into an appropriate perspectiveData data structure and assigning it to a camera object using the Escher procedure ErViewAngleAspectCamera__NewData. Once a camera object is obtained, it can be associated with the view object by calling ErView__SetCamera passing in the view object and the camera object. This call will increment the reference count of the camera object passed in. If the camera object was already set, its reference count will be decremented. The example program in Appendix A then disposes of the camera object using the Escher function ErObject__Dispose since the camera object is no longer separately needed.

4. Setting the Drawing Context

Before setting the draw context, a draw context object must be created and initialized. In the example program in Appendix A, this is accomplished by setting up an appropriate data structure pixmapData and passing it to the Escher procedure ErPixmapDrawContext__NewData. The draw context object is then associated with the view object using the call ErView__SetDrawContext and passing in the view object and the draw context object. The application program example in Appendix A then disposes of the draw context object by passing it to the Escher function ErObject__Dispose.

Other characteristics of the view can also be specified in a similar manner, such as lighting and shaders.

5. Selecting the Rendering Quality Level

This is described in more detail hereinafter.

It can be seen that the building and editing of one view object is entirely separate from the building and editing of another view object, so more than one view object (including those which specify the same or different renderers) can coexist without interfering with each other.

III. BUILDING A MODEL

The modeling paradigm used in Escher can be best understood by comparison to the modeling paradigms used in two existing products available from Apple Computer: QuickDraw and QuickDraw GX. QuickDraw GX is described in Apple Computer., "Quick-Draw GX Programmer's Overview" (1994), incorporated herein by reference. Both QuickDraw and QuickDraw GX perform two-dimensional graphics processing rather than three-dimensional processing. The QuickDraw two dimensional graphics system features a procedural interface and a global graphics state which defines the color, transfer mode and pattern of the shapes that it draws. When the QuickDraw shape drawing routines are called, QuickDraw draws the shape according to the variables in its graphics state. An application program can manipulate the graphics state through the use of other calls to QuickDraw.

QuickDraw GX differs from QuickDraw in that rather than a procedural interface with a system-maintained graphics state, shapes are represented as objects that encapsulate all information needed to draw them. There is no system-maintained graphics state. Because shapes are objects, QuickDraw GX can provide utilities to operate on such shapes that QuickDraw cannot, because QuickDraw's routines only draw images to a pixel map. QuickDrawGX provides functionality to operate on shapes, such as "hit" testing and geometric intersection.

The main data type in QuickDraw GX is a "shape", which encapsulates geometry and other drawing information. Shapes are drawn through a "view port" which transforms the shapes into "view device" coordinates. When a shape is passed to QuickDraw GX for drawing, the shape is drawn through each view port that is attached to the shape. A view port may overlap several view devices, in which case the shape is drawn to each view device at its correct resolution. QuickDraw GX shapes can be organized into hierarchies through the use of the "picture shape". Each shape has a "type" associated with it that indicates whether it is a line, polygon, curve, etc. Access to shapes is through a procedural interface and handle.

QuickDraw GX's shape drawing procedure can be called at any time to draw a shape. The ordering of shapes being drawn on top of each other is dependent on the order in which they are drawn. No state information is retained between drawing commands, except for internal caching information, since each shape encapsulates all the information needed to draw that shape including the view port, view device, color, transfer mode and drawing style.

The Escher system differs significantly from QuickDraw and QuickDraw GX due to the nature of three-dimensional rendering algorithms and the typically larger volumes of data required to describe a three-dimensional model.

Escher shapes do not encapsulate all information required to draw themselves. Rather, Escher maintains a "state" that provides additional information on how a shape is to be rendered, much as the original QuickDraw maintains a drawing state for the foreground color in the graphics port. Escher's state mechanism allows hierarchical models to be built which specify information such as color or drawing style that is inherited by shapes at lower levels of the hierarchy. The mechanism provides increased flexibility in instancing a model to be used several times in a scene but with varying attributes without respecifying the geometry. Escher also differs from QuickDraw GX in that the drawing area for rendering is specified in Escher prior to the rendering of the image, through attachment to a view object, rather than being attached to every shape as in QuickDraw GX.

Escher provides several data types to encapsulate geometry and appearance in a model hierarchy. The general classes of data types are geometry, "attribute set", style, transform and group. It is advantageous to separate appearance into several types of data in this manner due to the typical complexity of three-dimensional models. Even simple three-dimensional shapes may require hundreds or thousands of geometric shapes in order to produce any semblance of realism. To create a realistic-appearing scene of any complexity, such as a room in a house, may require hundreds of thousands or even millions of geometric shapes. When dealing with models of this magnitude, it is often advantageous to apply a single appearance characteristic to a large group of geometric shapes, thereby saving memory and simplifying the building and editing of such a model. The above data types facilitate these goals.

In QuickDraw GX model hierarchies, transform mappings of a "picture shape" are considered concatenated with those of the shapes that they encompass. This provides a means of referencing the same shape more than once, and using transform mappings to move or transform the shape without having a second copy of it stored in memory. Such concatenation is accomplished in QuickDraw GX through a state mechanism which keeps a record of the "current transformation mapping" as a model hierarchy is traversed. QuickDraw GX picture hierarchies are traversed from top to bottom, left to right. As shapes lower in the hierarchy are traversed, their transform mappings are concatenated with the current transform mapping. After all shapes inside a picture shape have been drawn, the traversal returns to the previous picture, if any, and resumes traversal of its 'shapes. This is called "top-down traversal". When returning from a traversal, the current transformation mapping is restored to what it was before the picture shape was entered. This mechanism can be thought of as stack of mappings that is pushed and popped during traversal. When the root picture shape is finished drawing, the current mapping is NULL.

Escher provides a similar traversal mechanism, although due to increased complexity of three-dimensional models, more than merely a transform mapping is inherited. Appearances and styles are inherited as well.

Whereas in QuickDraw GX, there is no "current transform mapping" unless the QuickDraw GX system is traversing a picture, in Escher it is possible for an application program to push and pop the current state itself. In fact, application programs can maintain Escher shapes in an application-specific hierarchical data structure, if desired, and through careful sequencing of calls to the Escher procedures 202, can simulate a system hierarchy. This feature is extremely advantageous for application programs that use complex application-specific hierarchical data structures, such as animation systems, or when porting an existing application program that already has its own data structures. The PHIGS prior art system and other retained-mode systems require that the entire model reside in a single hierarchy, and GL treats each object independently. Escher, on the other hand, allows a mixture. An application program can set the state, draw a number of independent geometric objects, then have the Escher system render a model built and stored in the Escher system's data structure, then draw more independent geometric objects, and so on.

Figure 8:
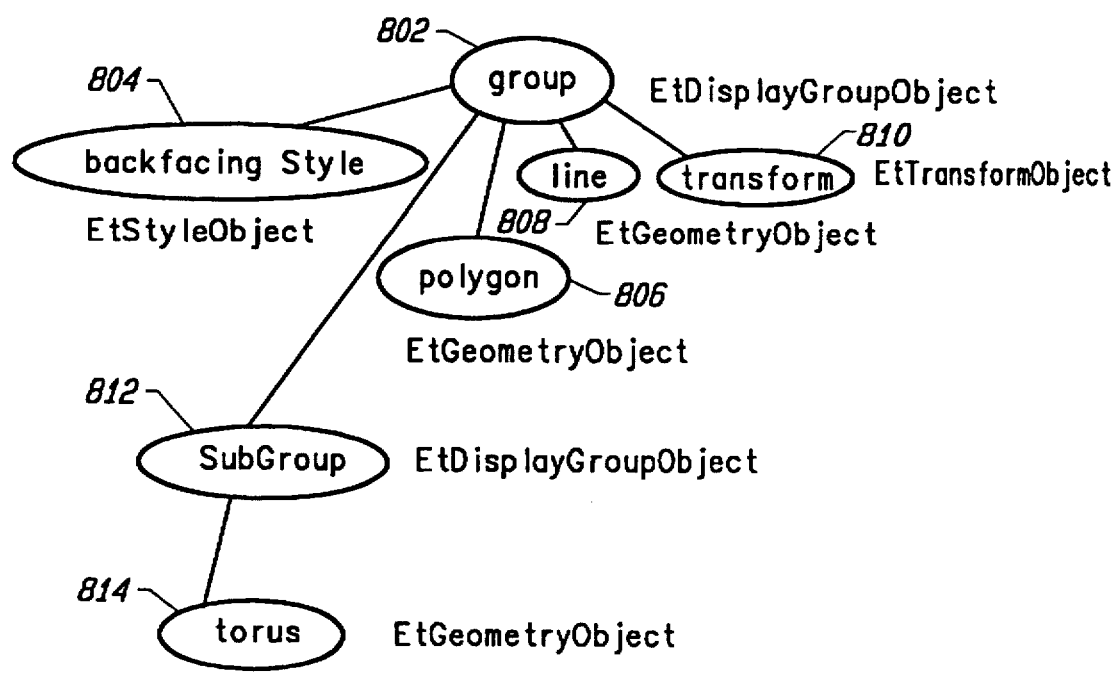
FIG. 8 illustrates a model hierarchy created by an example program using the invention.

FIG. 8 is a graph of a simple model hierarchy which is built by the example application program in Appendix A. It includes two levels, the first (root) level encapsulated by the EtDisplayGroupObject called "group" and the second encapsulated by the EtDisplayGroupObject called "sub-Group". Each EtDisplayGroupObject can be thought of as a node in the hierarchy. Each node can have associated therewith style objects, geometry objects, transform objects and other group objects (as in FIG. 8), as well as shader objects and attributes set objects.

Escher supports two kinds of EtDisplayGroupObjects, namely those in the subclass EtOrderedGroup and EtList-Group. Objects attached to an instance in the EtListGroup class have no order except the order in which they were added to the group. During traversal, when Escher encounters a list group object, each object in the list is processed ("executed") in the sequence in which it was added to the group originally. Referring to FIG. 8, once the group group is opened, during a traversal, Escher will execute backfacingstyle, then polygon, then line, then transform, then subGroup, in that sequence, since that was the sequence with which they were added to group. Thus the changes to the rendering state which are caused by backfacingStyle will apply to both polygon and line, whereas the changes to the rendering state caused by transform will apply only to the objects in subGroup. The Escher API includes calls which permit the application program to add objects to the beginning of the list, to the end of the list, or between objects already on the list.

A group object of subclass EtOrderedGroup is similar to a list group object, except that the traverser sorts the object attached to a group according to type before they are executed. In particular, objects are executed in the following sequence: transform objects, style objects, attribute set objects, shaders, geometries and additional groups.

For both kinds of group objects, when a subgroup is opened, the then-current state of the renderer is inherited. Objects in the subgroup can change any characteristic of the state for subsequently executed objects in the subgroup (or in subgroups of the subgroup), but upon return to the parent group, the state is restored to its condition before the traverser entered the subgroup.

Group objects also have a "state" associated with them, although this is not to be confused with the "state" of the traverser. The state of a group is merely a collection of flags that define aspects of how the group is to behave. Most of the flags are not important for an understanding of the present invention, but it may be helpful to understand one such flag, namely "in-line".

In modeling applications, it sometimes can be useful to group a set of materials or styles together into a bundle that can be referenced several times in a model. However, if such a bundle is created using the normal pushing and popping of traverser state as described above, these objects will not have the desired effect on the model as the group will pop the state after it is executed by the traverser. Accordingly, the application program can set the "in-line" flag of the group object, thereby specifying that entry to the group and exit from the group are not to push or pop the state of the traverser. The Escher API provides procedure calls to set, clear and get the current value of this flag.

A. Data Structures

As with the procedure for building a view, it will be helpful to described certain data structures before describing the Escher procedures which an application program can call to build a model.

Figure 9:
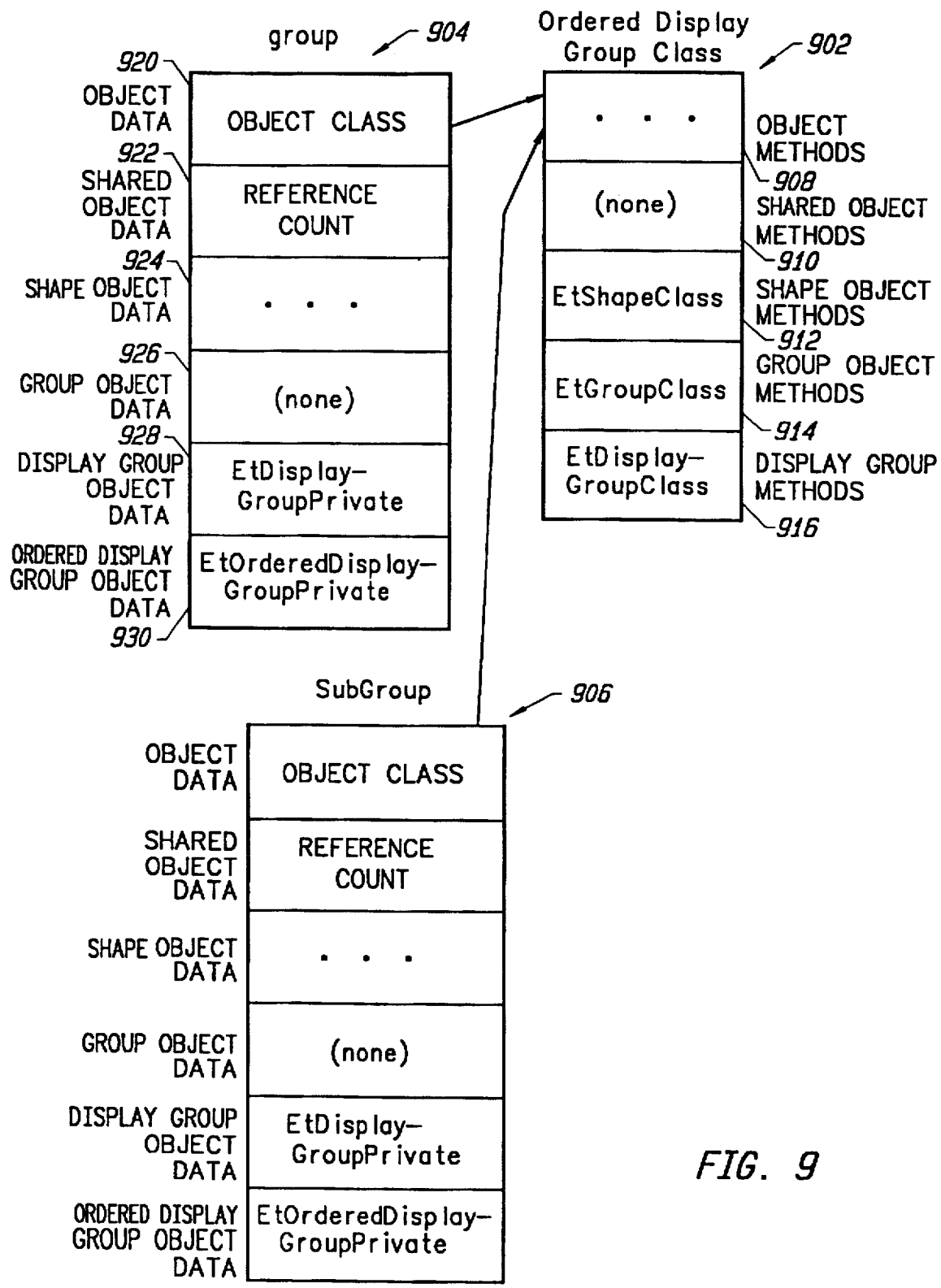

In the example application program in Appendix A, the groups group and subgroup are ordered display group objects. They have a type EtDisplayGroup, which in the class hierarchy of FIG. 6, has a class ancestry of EtGroupObject, EtShapeObject, EtSharedObject, and ultimately EtObject. Accordingly, they are represented in memory with data structures as shown in FIG. 9. Specifically, the ordered display group class method table is contained in a block of memory 902, and the instance data for group and subGroup are contained in blocks 904 and 906, respectively. The ordered display group class 902 begins with the region 908 containing pointers to object methods, similarly to region 504 in FIG. 5. Region 908 is followed by region 910, which contains pointers to all methods specific to shared objects (there are none in the present embodiment). This is followed by a region 912, containing pointers to all shape object methods, and this is followed by a region 914 containing pointers to the methods specific to group objects. The last-mentioned data structure, EtGroupClass, has the following typedef:

```
Copyright © 1994 Apple Computer, Inc.
typedef struct EtGroupClass {
    EtGroupAcceptObjectMethod        accept;
    EtGroupGetObjectListMethod       getObjectList;
    EtGroupCountObjectsMethod        countObjects;
    EtGroupAddObjectMethod           add;
    EtGroupAddObjectBeforeMethod     addBefore;
    EtGroupAddObjectAfterMethod      addAfter;
    EtGroupRemoveObjectMethod        remove;
    EtGroupEmptyMethod               empty;
} EtGroupClass;
```

As can be seen, it includes entries for pointers to several methods, including, among other things, a method to add an object to the end of the group (add), and methods to add an object at a specific location within the list of objects already assigned to a group (addbefore and addafter).

After region 914, the ordered display group class method table 902 contains pointers to the methods specific to display groups in a region 916. This data structure, EtDisplayGroupClass, is defined as follows:

```
Copyright © 1994 Apple Computer, Inc.
typedef struct EtDisplayGroupClass {
    long                           displayGroupUniqueNumber;
    EtBoundingBoxMethod            boundingBox;
    EtBoundingSphereMethod         boundingsphere;
    EtDisplayGroupPickMethod       pick;
} EtDisplayGroupClass;
```

The methods in the EtDisplayGroupClass are not pertinent to an understanding of the invention, except to note that the class does not contain pointers to any drawing methods. As previously explained, these methods are identified in a view object rather than a group object, so that they can be overridden by a renderer. Any drawing method which is identified in the class for an object would become part of the model being built, would become intertwined with the model itself, and would be difficult to change when an application program desires to render the model using a different renderer. Such an arrangement would also make it difficult to have more than one renderer active simultaneously as previously described.

Referring again to the method table 902, as is typical of the design of the Escher system with respect to leaf classes in the class hierarchy (FIG. 6), the table contains no methods specific to ordered display groups.

The data structure of the instance data for subGroup is the same for that of group, so only the data structure for group will be described. As with the data structure of instance data block 512 in FIG. 5, the block 904 begins with object data in region 920, specifically a pointer to the ordered display group class block 902. This is followed by a region 922, containing the shared object data, specifically a reference count. This is followed by a region 924, containing the shape object data (which is also very short). The shape object data region 924 is followed by a region 926 containing the object data for group objects, of which there is none in the present embodiment.

The region 926 is followed by a region 928 containing the instance data for display group objects. Such data includes only the "state" flags described above. Region 928 is followed by a region 930, which contains the data specific to an instance of an ordered display group object. This data has a format defined as follows, where EtDLList is a typedef for a doubly linked list:

```
Copyright © 1994 Apple Computer, Inc.
typedef struct EtOrderedDisplayGroupPrivate {
    EtDLList        *transforms;
    EtDLList        *styles;
    EtDLList        *attributeSet;
    EtDLList        *shaders;
    EtDLList        *geometries;
    EtDLList        *groups;
} EtOrderedDisplayGroupPrivate;
```

As can be seen, the region 930 contains pointers to six doubly linked lists, one for each of the types of objects which can be added to a display group object. For completeness, note that if group were a list display group rather than an ordered display group, the only difference would be the structure of region 930. Specifically, region 930, which would have a structure defined as EtListDisplayGroupPrivate, would contain only a pointer to a single doubly linked list for all the objects which are added to the display group.

In addition to the EtDisplayGroupObject structure, the example application program in Appendix A also uses an EtStyleObject data structure, an EtGeometryoject data structure, and an EtTransformObject data structure. These structures all refer to classes of objects which, like EtGroupObject are subclassed from the EtShapeObject class (see FIG. 6). As with other objects described herein, they each refer to a method table like 902 in FIG. 9, and contain private instance data, like region 904 or 906 in FIG. 9. These three classes are each subclassed from the same parent class (EtShapeObject) as is EtGroupObject(see FIG. 6), and therefore the first three layers of both the class data and the instance data will have the same structure as shown in FIG. 9. The leaf class (Backfacingstyle) actually used in the example program in the EtStyleObject class is a subclass of the EtStyleObject class, so the fourth and last layer of the class methods for that object will contain pointers to the methods specific to style objects. The fourth layer of the instance data contains private data appropriate to all style objects, if any, and the fifth and last layer contains data appropriate to backfacing style objects.

Similarly, the leaf class (translate) actually used in the example program in the EtTransformObject class is a subclass of the EtTransformObject class (see FIG. 6), so the fourth and last layer of the class methods for the transform object contains pointers to methods specifically for transform objects. The fourth layer of instance data for the transform object contains data specific to transform objects, and the fifth and last layer contains data specific to translate transform objects.

The example program creates three objects (polygon, line, torus) which are geometry objects, and all of them are in leaf classes which are subclasses of the EtGeometryObject class (see FIG. 6). Thus the fourth and last layer of the class method table for each of these objects contains pointers to methods specifically for geometry objects. The fourth layer of the instance data for each of these objects contains data specifically for any geometry object, and the fifth and last layer of the instance data for each of these objects contains data specifically for polygon, line and torus objects, respectively.

In Escher, whereas attribute sets (containing attributes such as diffuse color) define surface appearance characteristics, styles tell a renderer how to draw a geometric shape. For example, a polygon can be rendered as a solid filled shape, or with its edges only. Another example is that surfaces can be rendered smoothly or with a faceted appearance. Yet another example, indicated by a backfacing style object (subclass of EtStyleObject), determines whether or not shapes that face away from the camera are to be displayed. EcBackfacingStyle_RemoveBackfacing, the characteristic used in the example program in Appendix A, specifies that shapes that face away from the camera are not to be drawn. The private data for a backfacing style object contains a longword which contains a constant indicating whether both front and backfacing surfaces are to be drawn, whether backfacing surfaces are to be removed, or whether backfacing surfaces that do not have two-sided attributes are to have their normals flipped so that they always face toward the camera. An application program specifies style characteristics in a model by creating an appropriate style object and adding it at a desired position in a group object of the model.

For geometry objects, the private data in the last layer of instance data contains information necessary to describe a particular geometry. For example, the private data in the last layer of a polygon object specifies the number of vertices, the vertices and certain attributes not here relevant. The private data in the last layer of a line object contains the locations of the two end points of the line, as well as some attribute data, and the private data in the last layer of a torus object contains an origin, an orientation, a major radius and a minor radius, as well as some attribute data.

A transform object allows the coordinate system containing geometric shapes to be changed, thereby allowing objects to be positioned and oriented in space. Transforms are useful because they do not alter the geometric representation of objects (the vertices or other data that describe the shape), rather they are applied as matrices at rendering time, temporarily "moving" an object in space. This allows a single object to be referenced multiple times with different transformations in a model, providing the ability to have an object placed in many different locations within a scene. An application program specifies a transform by creating an appropriate transform object, from a subclass of the EtTransformObject class (FIG. 6), and adding it at an appropriate position in an appropriate group in a model. A transform specified by an application program remains in the form specified until the time of rendering, at which point Escher converts the transformation to a temporary matrix that is applied to subsequent objects in the group. Matrices are premultiplied to vectors of an object. Escher transformations pre-multiply the current transformation matrix; therefore, application programs specify transformations that are to be concatenated in reverse order. This is consistent with the application of matrices in a hierarchy. That is, matrices that are specified at the top of the hierarchy are applied last, and matrices specified just prior to an object are applied first.

Escher supports a number of different kinds of transforms, each of which is specified to Escher by using an object from a respective subclass of EtTransformObject. Three such subclasses are illustrated in FIG. 6 (Rotate, Scale and Translate). The Escher API provides procedures for creating and disposing of transform objects, drawing them in immediate mode, setting their contents to new data, getting the private data of a transform object, writing a transform object to a file, and so on. The private data in the lowest layer of instance data for a translate transform object, which is the leaf class used in the example program in Appendix A, specifies the x, y and z coordinates of translation.

B. Procedures

1. ErOrderedDisplayGroup New()

Referring to Appendix A and FIG. 8, the example application program begins building the model of group 802 by first creating the new ordered display group object group, using the procedure ErOrderedDisplayGroup_New(). Escher's object creation mechanism is a recursive mechanism which is illustrated generally in the flowchart of FIG. 10. Note that the class method table for the ordered display group class was created during initialization upon registration of the ordered display group class, so only a block of instance data needs to be created and initialized in the new object mechanism.

Figure 10:
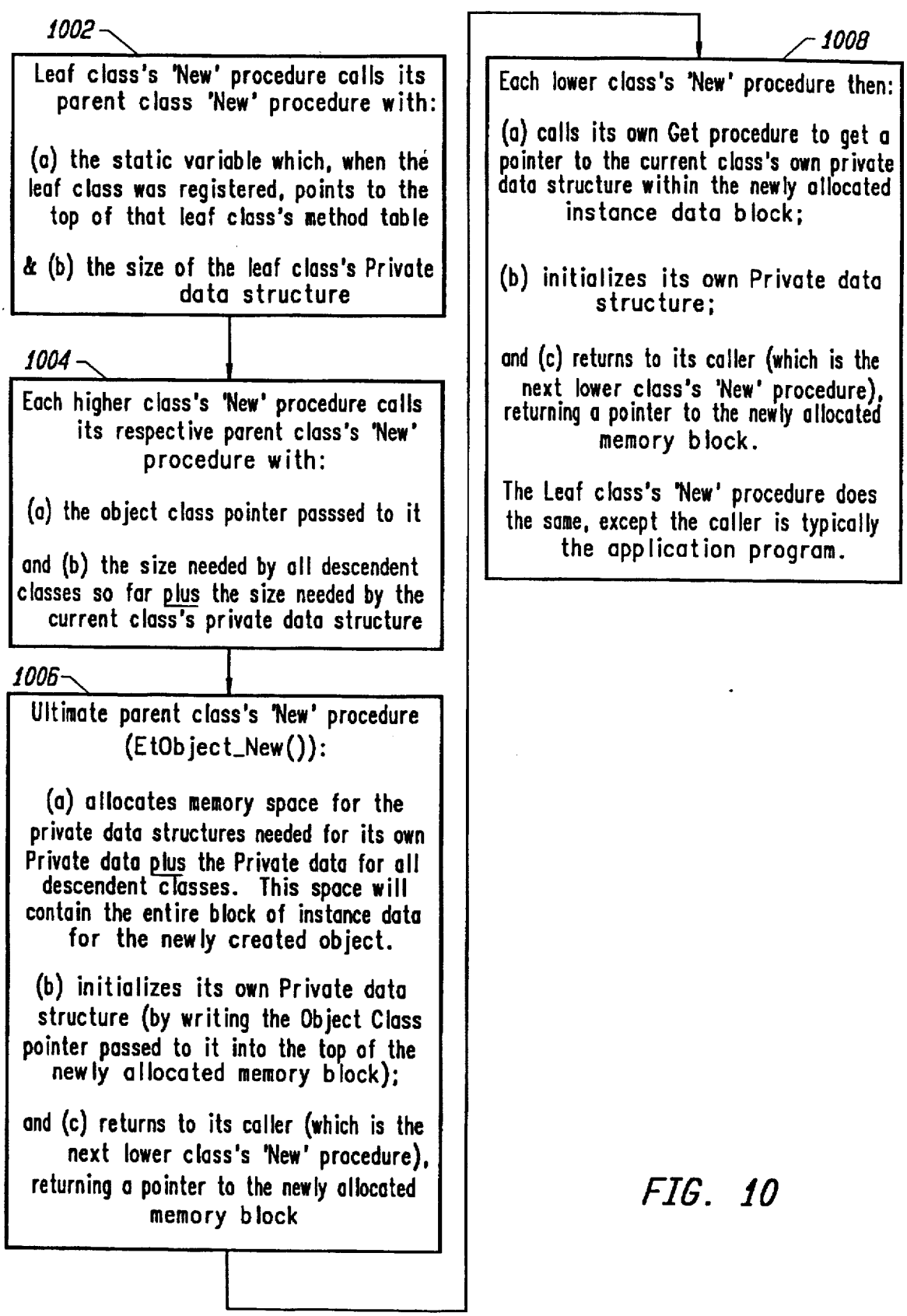
FIG. 10 is a flowchart illustrating the creation of a new object in memory.

Referring to FIG. 10, first, in a step 1002, the leaf class's 'New' procedure calls its parent class 'New' procedure with: (a) the static variable which, when the leaf class was registered, points to the top of that leaf class's method table, and (b) the size of the leaf class's Private data structure. In a step 1004, each higher class's 'New' procedure then calls its respective parent class's 'New' procedure with: (a) the object class pointer passed to it, and (b) the size needed by all descendent classes so far plus the size needed by the current class's private data structure. In a step 1006, the ultimate parent class's 'New' procedure (EiObject_New()) (a) allocates memory space for the private data structures needed for its own Private data plus the Private data for all descendent classes. This space will contain the entire block of instance data for the newly created object. It then (b) initializes its own Private data structure (by writing the Object Class pointer passed to it into the top of the newly allocated memory block), and (c) returns to its caller (which is the next lower class's 'New' procedure), returning a pointer to the newly allocated memory block. In a step 1008, each lower class's 'New' procedure then: (a) calls its own Get procedure to get a pointer to the current class's own private data structure within the newly allocated instance data block; (b) initializes its own Private data structure; and (c) returns to its caller (which is the next lower class's 'New' procedure), returning a pointer to the newly allocated memory block. The Leaf class's 'New' procedure does the same, except that the caller is typically the application program rather than a subclass's 'New' procedure.

A few sample ones of Escher's 'New' procedures will illustrate better how this is achieved. The 'New' procedure for an ordered display group object, which is the routine called by the application program, is as follows:

```
Copyright ® 1994 Apple Computer, Inc.
EtGroupObject EiOrderedDisplayGroup_New(
    void)
{
    EtGroupObject            group;
    EtOrderedDisplayGroupPrivate  *ordered;
    group = EiDisplayGroup_New(EgOrderedDisplayGroupClass,
            sizeof(EtOrderedDisplayGroupPrivate));
    if (!group) {
        return (NULL);
    }
    ordered = EiOrderedDisplayGroup_GetOrderedDisplayGroup(group);
    ordered->transforms    =
    ordered->styles        =
    ordered->attributeSet  =
    ordered->shaders       =
    ordered->geometries    =
    ordered->groups        = NULL;
    return (group);
}
```

As can be seen this routine first calls the 'New' procedure of its parent class, EiDisplayGroup_New() with the pointer to the ordered display group class method tables EgOrderedDisplayGroupClass and the size of the private data structure EtOrderedDisplayGroupPrivate needed in the lowest layer of the instance data for the object being created. When that procedure returns, the block of instance data has been allocated and higher levels have been initialized. After some error checking, the EiOrderedDisplayGroup_New() procedure gets a pointer (ordered) to the ordered display group private data structure of the allocated block, and initializes all of the doubly linked lists to NULL. The procedure then returns to the application program, returning the pointer to the newly created instance data block.

The 'New' procedure of the display group class is as follows:

```
Copyright ® 1994 Apple Computer, Inc.
EtGroupObject EiDisplayGroup_New(
    EtObjectClass          ObjectClass,
    unsigned long          dataSize)
{
    EtGroupObject          newGroup;
    EtDisplayGroupPrivate  *groupPrivate;
    EiAssert (ObjectClass);
    newGroup = EiGroup_New(objectClass,
            sizeof(EtDisplayGroupPrivate) + dataSize);
    if (newGroup == NULL) {
        return (NULL);
    }
    groupPrivate = EiDisplayGroup_GetDisplayGroup (newGroup);
    EiAssert (groupPrivate);
    groupPrivate->state = EcDisplayGroupStateMask_IsDrawn   |
            EcDisplayGroupStateMask_UseBoundingBox          |
            EcDisplayGroupStateMask_UseBoundingSphere       |
            EcDisplayGroupStateMask_IsPicked                &
            (~EcDisplayGroupStateMask_IsInline);
    return (newGroup);
}
```

As can be seen, this procedure first calls its own parent class's 'New' procedure EiGroup_New, passing the pointer to the object class and a data size given by the size of private data needed by the parent class plus the amount of memory space needed for the private data of objects in the group class (EtDisplayGroupPrivate). After error checking, EiDisplayGroup_New() gets a pointer groupPrivate to the group object's private data and initializes it. The procedure then returns to its caller, EiOrderedDisplayGroup_New().

The 'New' procedure in the EtGroupObject class is as follows:

```
Copyright ® 1994 Apple Computer, Inc.
EtGroupObject EiGroup_New(
    EtObjectClass          ObjectClass,
    unsigned long          dataSize)
{
    EtGroupObject          newGroup;
    EiAssert (objectClass);
```

```
newGroup = EiShape_New(objectClass, NULL, dataSize);
if (newGroup == NULL)
{
   return NULL;
}
return newGroup;
}
```

The above procedure follows the same outline as the 'New' procedures for the display group class and the ordered display group class, with the variation that there is no private data specifically for the class EtGroupObject. Thus the EiGroup_New() procedure does not initialize any private data, and the data size which it passes to the 'New' procedure of the parent class, EiShape_New(), is the same as the data size which is passed by the display group class's 'New' procedure to EiGroup_New().

The procedures continue up through the 'New' procedure of the EtObject class. It will be appreciated that Escher uses the same recursive mechanism to create objects in every class of the class hierarchy. Moreover, it will be appreciated that Escher uses similar recursive techniques to perform the functions of a large number of the Escher API calls.

2. ErGroup_AddObject()

Referring again to the example application program in Appendix A, after a new ordered display group object group is created, the program creates a backfacing style object and adds it to the group. This part of the example program is not important for an understanding of the invention, but rather is included merely to illustrate that such an object can be added to a group.

Next, the example program creates a polygon object polygon using the Escher procedure ErPolygon_New(). This procedure operates similarly to the 'New' procedures described above with respect to the creation of an ordered display group object, and need not be described again. The example program then adds polygon to group using the Escher API call ErGroup_AddObject(). The latter procedure is as follows:

```
Copyright © 1994 Apple Computer, Inc.
EtGroupPosition EiGroup_AddObject(
   EtGroupObject     group,
   EtSharedObject    Object)
{
   EtGroupClass     *groupClass;
   EiAssert (group);
   EiAssert (object);
   if (EiGroup_AcceptObject(group, object) == EcObjectType_Invalid)
   {
      EiError_Post(EcError_InvalidObjectForGroup, NULL);
      return NULL;
   }
   groupClass = EiShape_GetSubClassMethods(group,
              EcShapeType_Group);
   EiAssert(groupClass);
   EiAssert(groupClass->add);
   return (*groupClass->add) (group, object) ;
}
```

As can be seen, this procedure receives as arguments the object to add to the group, and the group to which it is to be added. After some bookkeeping operations, the procedure calls EiGroup_AcceptObject (), an Escher procedure, in order to determine whether the specified object is of a type which can be added to the specified kind of group object. For example, if the specified object is a light object, it cannot be added to an ordered display group. In the present case, the result is valid, since a polygon can be added to an EtOrderedDisplayGroup object.

The procedure then obtains a pointer groupclass to the EtGroupObject class method table for the specified ordered display group object, by calling the "get subclass methods" procedure of EtGroupObject's parent class, EtShapeObject. The procedure than calls the "add object" procedure pointed to in that method table and returns to the application program.

The pointer in the method table to the "add object" procedure for the specified kind of group object was written there during initialization when the EtOrderedGroup class registered itself. The specified "add object" procedure is as follows:

```
Copyright © 1994 Apple Computer, Inc.
EtGroupPosition EiOrderedDisplayGroup_AddObject (
   EtGroupObject     group,
   EtObject          object)
{
   EtOrderedDisplayGroupPrivate  *groupData;
   EtGroupPosition               newPosition;
   EtDLList                      *theList;
   EtObjectType                  objectType;
   EiAssert(group);
   EiAssert(object);
   groupData = EiOrderedDisplayGroup_GetOrderedDisplayGroup
              (group);
   EiAssert(groupData);
   objectType = EiGroup_AcceptObject(group, object);
   if (objectType == EcObjectType_Invalid) {
      EiError_Post (EcError_InvalidObjectForGroup,
         EiWarning_Message(
            "Invalid object for ordered group: % s",
            EiObjectClass_GetName (EiObject_GetClass (object))));
      return (NULL);
   }
   theList = EiOrderedDisplayGroup_GetObjectList(groupData,
                      objectType,
                      EcTrue);
   if (theList == NULL) {
      return (NULL);
   }
   newPosition = EiGroupPosition_New(group, object);
   if (newPosition == NULL) {
      return (NULL);
   }
   EiDLList_InsertNodeLast (theList, (EtDLListNode *)newPosition);
   return (newPosition);
}
```

Referring to this procedure, it can be seen that it first uses the ordered display group class's "get" procedure to obtain a pointer groupData to the private data of the specified ordered display group object. The procedure then obtains the type of the specified object to add (which is a geometry object) and, after some error checking, calls EiOrderedDisplayGroup_GetObjectList() to obtain a pointer, theList, to the particular doubly linked list of the ordered display group object for geometry objects. The procedure calls EiGroupPosition_New() to create a new list "position" object, and calls EiDLList_InsertNodeLast() to insert the new "position" object at the end of the doubly linked list. The procedure then returns to its caller, EiGroup_AddObject().

For completeness, it will be appreciated that the procedure for adding an object to a list display group object is very similar to that for adding an object to an ordered display group object, except that there is only one doubly linked list in a list display group object. It is therefore unnecessary to determine one of six lists to which the object is to be added. It will also be appreciated that in addition to an add-object procedure, Escher's API also includes procedures to add an object after a specified position in the list of the group, add an object before a specified position in a list of the group, remove an object from a specified position in a list of the group, iterate forward and backward through a list of the group, as well as other procedures.

3. ErObject_Dispose()

After adding an object to the group, the example program in Appendix A "disposes" of the polygon object since it is no longer needed in the application program (apart from its presence in the model being created). So far as the application program is concerned, the polygon object has been deleted. However, in actuality, the Escher ErObject_Dispose() procedure does not at this time delete the polygon object and de-allocate its memory space. Instead, since polygon is a shared object, Escher merely decrements the reference count in the shared object private data for the polygon object. The reference count was set to 1 when polygon was created, and was incremented by 1 when it was added to group. Thus the application program's called to ErObject_Dispose() merely decrements the reference count from 2 to 1. If the decrementing of the reference count reduces it to 0, then Escher actually deletes the object and de-allocates its memory space.

4. New Line Object

The example program in Appendix A next creates a new line object line, adds it to the ordered display group object group, and then "disposes" of the line object line. The Escher procedure calls to accomplish this are similar to those described above with respect to the polygon object polygon, and need not be repeated here.

5. Adding a Transform Object

After placing a style object and two geometry objects into the ordered display group group, the example program in Appendix A creates a translate transform object and adds it to the group. The transform object transform is created by calling the Escher procedure ErTranslateTransform_New(), which operates in a recursive manner similarly to ErOrderedDisplayGroup_New() as described above. The example program's subsequent calls to ErGroup_AddObject(group, transform) and ErObject_Dispose (transform) operate as described above. Note that although the example program adds the transform object to the ordered display group object after it has already added two geometry objects, the nature of an ordered display group calls for transform objects to be executed prior to geometry objects. Escher ensures this characteristic by placing the transform object on a separate doubly linked list within the ordered display group object group exclusively for transforms, and placing the geometry objects in a doubly linked list exclusively for geometry objects. Upon rendering, as described hereinafter, Escher will traverse the transform object list before it traverses the geometry object list.

6. Creation and Addition subGroup

After adding the transform object to the ordered display group object group, the example program in Appendix A creates a new ordered display group subGroup by calling ErOrderedDisplayGroup_New(). This procedure is described above. The example program then adds subGroup to the previously created ordered display group object group, using the ErGroup_Addobject() Escher procedure also described above. The example program has thus now created the hierarchy illustrated in FIG. 8. The example program then creates a new geometry object, specifically a torus geometry object torus using an Escher procedure ErTorus_New(), which operates similarly to ErPolygon_New() described above. It then adds torus to subGroup using ErGroup_AddObject(), and disposes of both torus and subGroup using ErObject_Dispose(). At this point, the entire model illustrated in FIG. 8 has been built and the example program moves on to step 308 (FIG. 3), rendering the model to the view.

IV. RENDERING THE MODEL TO THE VIEWS

In Escher, the rendering of objects to a view takes place between calls to ErView_StartRendering() and ErView_EndRendering(). These procedures merely initialize relevant data structures prior to rendering (including pushing an initial state onto a traversal stack) and clean up various bookkeeping information after rendering, respectively. They also include calls to the renderer's own start and end procedures, so that the renderer can do the same. The renderer's start and end procedures were specified to Escher upon registration of the renderer and are identified in appropriate method tables. Specifically, the renderer's end-rendering procedure was returned by the renderer's metahandler in response to being called with the EcMethodType_EndRenderer constant.

Escher supports multi-pass rendering in which Escher traverses the model more than once, calling appropriate renderer procedures each time. Escher indicates that a re-traverse is required by returning a status flag, EcViewStatus_ReTraverse, from the ErView_EndRendering() procedure. When the application program calls ErView_EndRendering(), that procedure in turn calls the renderer's end-rendering procedure. In the case of the wireframe renderer, this procedure is called ErWF_End(). The renderer returns the re-traverse flag to Escher's ErView_EndRendering() procedure, which in turn returns the same to the application program as EcViewStatus_ReTraverse. Thus the preferred technique is for the application program to place the model drawing calls inside a do loop which repeats for as long as ErView_EndRendering() returns EcViewStatus_ReTraverse. This is the format used in the example program in Appendix A.

Note that the calls to ErView_StartRendering() and ErView_EndRendering() take a view object view as an argument. An application program can call these procedures in any sequence, specifying different view objects, as long as the call to ErView_EndRendering() for a particular view object is subsequent the call to ErView_StartRendering() for the same view object, and all drawing calls to that view are in between. It is also an error to call ErView_StartRendering() twice for a particular view object without calling ErView-EndRendering() for the same view object in between, and it is an error to call ErView_EndRendering() for a particular view object without having first called ErView_StartRendering() for that view object. However, different view objects can specify the same renderer if desired, since the instance data for the different view objects are separate. The example application program in Appendix A takes a very simple tack in rendering the model twice, specifically by rendering the model completely using the view object previously defined, which specifies the wire frame renderer, then changing the choice of renderer in the view object to point to a Z-buffer renderer, and rendering the model completely once again to the same, now-changed, view object.

Between calls to ErView_StartRendering() and ErView_EndRendering(), an application program can make calls to either immediate mode Escher drawing procedures or retained mode Escher drawing procedures, or both. The immediate mode routines take data structures (such as a polygon data structure) as parameters, whereas retained mode routines take objects (such as an EtGeometryObject) as parameters. Immediate mode routines do not instigate a traversal of any model, whereas certain retained mode routines, such as ErDisplayGroup_Draw(), do instigate a traversal of a model.

A. Traversing a Model

Accordingly, the example application program in Appendix A makes a single call to Escher's renderer invocation procedures 212 (FIG. 2), specifically a call to ErDisplayGroup_Draw(). The application program passes in the model to render (represented by the ordered display group object group which forms the root node of the model hierarchy) and the view to which the model is to be rendered (by passing the view object view). The application program could at this time also make additional calls to Escher's renderer invocation procedures 212, to render additional objects (including additional models) into the same view. The ErDisplayGroup_Draw() procedure is as follows:

```
Copyright © 1994 Apple Computer, Inc.
EtStatus EiDisplayGroup_Draw(
    EtDisplayGroupObject  group,
    EtViewObject          viewObject)
{
    EtStatus              (*func) (EtDisplayGroupObject,
                                   EtViewObject);
    EtViewPrivate         *viewPrivPriv;
    EtDisplayGroupState   state;
    EtStatus              result;
    viewPrivPriv = EiView_GetView(viewObject);
    EiAssert(viewPrivPriv != NULL);
    if (viewPrivPriv->cancelRendering)
        return (EcSuccess);
    EiView_CheckStarted (viewPrivPriv, "EiDisplayGroup_Draw");
    EiDisplayGroup_GetState (group, &state);
    if ((state & EcDisplayGroupStateMask_IsDrawn) == 0) {
        return (EcSuccess);
    }
    func = (EtStatus (*) (EtDisplayGroupObject, EtViewObject))
        EiMethodTable_GetMethod(
            viewPrivPriv->rendererClass->groupMethods,
            EiDisplayGroup_GetTypeIndex (group));
    if (func == NULL) {
        return (EcSuccess);
    }
    if ((state & EcDisplayGroupStateMask_IsInLine) != 0) {
        return (*func) (group, viewObject);
    }
    if (EiView_PushState(viewObject) != EcSuccess) {
        return (EcFailure);
    }
    result = (*func) (group, viewObject);
    if (EiView_PopState(viewObject) != EcSuccess) {
        return (EcFailure);
    }
    return result;
}
```

Referring to the above procedure, after some error checking, the procedure first determines that group is an ordered display group by passing group to an Escher EiDisplayGroup_GetTypeIndex() procedure. It then obtains a pointer func to the drawing method which the ordered display group class registered during initialization with the EtDisplayGroup class method tables for ordered display group objects. If the "in-line" flag is set for the object group, then the procedure next calls the procedure pointed to by func, passing in group and the view object to which the group is to be rendered.

If the "in-line" flag for the object group is not set, then the EiDisplayGroup_Draw() procedure "pushes" the traversal state before calling the procedure identified by func and "pops" the traversal state afterwards.

In one embodiment, the state of traversal is represented as the current position in a stack which may be pushed and popped, and which contains at each level a concatenation of all of the transform matrices prior to that level, the current style characteristics, the current shader characteristics and the current attribute sets. Each time the traversal state is "pushed", a new level is created and all of this information is copied from the prior level to the current level of the stack. Moreover in this embodiment, the concatenation of transform matrices takes place by actually performing each matrix pre-multiplication as the transform object is encountered in the traversal.

In a preferred embodiment, however, the current transform, the current style characteristics, the current attribute sets and the current shader characteristics are stored in a plurality of stacks, each of which is pushed only when necessary. A master "state" stack maintains a record at each level of which of the component stacks need to be popped when the overall traversal state is popped from that level. For example, the current transform state is represented using several component stacks, such as a current "local-to-world" matrix stack, an inverse matrix stack, and so on. But instead of calculating these matrices on each push of the overall traversal state, only the sequence of transformation matrices, from the lastcalculated matrix to the current position in traversal of the model, is recorded. The actual calculation is not performed unless and until it is actually needed. In this manner, a large number of matrix computations are avoided.

It should be noted that in retained mode, Escher pushes and pops as required during its traversal of the model. In immediate mode, the application program can also call Escher push and pop routines so that by careful sequencing of calls, the application program can perform its own traversal of its own model database.

Returning to EiDisplayGroup_Draw(), the procedure pointed to by func is EiView_OrderedDisplayGroup(), which is as follows:

```
Copyright © 1994 Apple Computer, Inc.
EtStatus EiView_OrderedDisplayGroup(
    EtGroupObject   group,
    EtViewObject    viewObject)
{
    EtOrderedDisplayGroupPrivate    *groupData;
    groupData = EiOrderedDisplayGroup_GetOrderedDisplayGroup
        (group);
    if (EiDisplayGroupList_Draw(groupData->transforms,
                    viewObject,
                    EiTransform_Draw) == EcFailure    ||
        EiDisplayGroupList_Draw (groupData->styles,
                    viewObject,
                    EiStyle_Draw) == EcFailure        ||
        EiDisplayGroupList_Draw (groupData->attributeSet,
                    viewObject,
                    EiAttributeSet_Draw) == EcFailure ||
        EiDisplayGroupList_Draw (groupData->shaders,
                    viewObject,
                    EiShader_Draw) == EcFailure       ||
        EiDisplayGroupList_Draw (groupData->geometries,
                    viewObject,
                    EiGeometry_Draw) == EcFailure    ||
        EiDisplayGroupList_Draw (groupData->groups,
                    viewObject,
                    EiDisplayGroup_Draw) ==
                    EcFailure) {
        return (EcFailure);
    }
    return (EcSuccess);
}
```

As can be seen, the above procedure calls a generalized display group list drawing function EiDisplayGroupList_Draw() six times, each time passing in a reference to a different one of the six doubly linked lists in the private data of the ordered display group object group. Specifically, the procedure calls the list drawing procedure with a reference first to the list of transforms, then with the reference to the list of styles, then with the reference to the list of attribute sets, then with a reference to the list of shaders, then with a reference to the list of geometries in the group, and then with a pointer to the list of subgroups in the group. Each time, the procedure also passes to the list drawing procedure a reference to the particular procedure which draws the kind of objects which are on the list. For example, when the list of transforms is passed to EiDisplayGroupList_Draw(), a reference to the Escher procedure EiTransform_Draw() is also passed. As another example, when the list of geometries is passed to EiDisplayGroupList_Draw(), a reference to the Escher procedure EiGeometry_Draw() is also passed in.

It will be appreciated that if group were a list display group object rather than an ordered display group object, only one call would be made to EiDisplayGroupList_Draw (). This call would pass in a reference to the single list of objects attached to group, and a reference to a procedure which both determines the type of each object as it is encountered on the list, and calls the appropriate Escher drawing procedure for that type.

The generalized list drawing procedure is as follows:

```
Copyright © 1994 Apple Computer, Inc.
EtStatus EiDisplayGroupList_Draw(
    EtDLList         *objectList,
    EtViewObject     viewObject,
    EtStatus         (*draw) (
        EtObject         object,
        EtViewObject     viewObject))
{
    EtGroupPosition gPos;
    EiAssert(viewObject);
    EiAssert (draw);
    if ((objectList != NULL) && (EiDLList_GetLength(objectList)>0)){
        for (gPos =
            (EtGroupPosition)EiDLList_GetFirstNode(objectList);
            gPos != NULL;
            gPos = (EtGroupPosition)EiDLListNode_Next(objectList,
                (EtDLListNode *)gPos)) {
            /* EiView_SetCurrentPathIndex(view, a); */
            if ((*draw) (gPos->object, viewObject) != EcSuccess) {
                return (EcFailure);
            }
        }
    }
    return (EcSuccess);
}
```

As can be seen, this procedure merely loops through all of the objects on the doubly linked list which was specified by the caller, and for each such object, passes the object to the drawing procedure specified by the caller.

Several of the Escher object drawing procedures which are called by the list drawing procedure will now be described. However, for convenience of description, they will be described in a different sequence from that in which they would called when rendering an ordered display group.

B. Drawing Subgroup Objects of a Display Group Object

Escher traverses the model in a recursive manner, and for this reason, the Escher procedure which ErView_OrderedDisplayGroup() passes to the list drawing procedure for group objects encountered in the group object group, is simply EiDisplayGroup_Draw(). This procedure is described above.

C. Drawing Geometry Objects in a Display Group Object

The Escher procedure which EiView_OrderedDisplayGroup() identifies to the list drawing routine for geometry objects is EiGeometry_Draw(), which is as follows:

```
Copyright © 1994 Apple Computer, Inc.
EtStatus EiGeometry_Draw(
    EtGeometryObject    geometry,
    EtViewObject        viewObject)
{
    EtViewPrivate *view;
    view = EiView_GetView(viewObject);
    EiAssert(view != NULL);
    if (view->cancelRendering) {
        return (EcSuccess);
    }
    EiView_CheckStarted(view, "EiGeometry_Draw");
    return ((*view->rendererClass->geometryDrawMethod) (geometry,
                viewObject));
}
```

As can be seen, the above procedure merely performs certain error checking and then calls the geometry draw method which was registered by the geometry class. This method is generic to all geometry objects, and is as follows:

```
Copyright © 1994 Apple Computer, Inc.
static EtStatus EiGeometry_DrawMethod(
    EtGeometryObject    geometry,
    EtViewObject        viewObject)
{
    void        (*func) (
                    EtGeometryObject    geometry,
                    EtViewObject        view);
    EtViewPrivate *view;
    view = EiView_GetView(viewObject);
    EiView_CheckStarted (view, "EiGeometry_Draw");
    func =
    EiMethodTable_CheckMethod(view->rendererClass->
    geometryDrawMethods,
    EiGeometry_GetTypeIndex(geometry));
    if (func) {
        (*func) (geometry, viewObject);
    } else {
        EiGeometry_Decompose(geometry, viewObject);
    }
    return (EcSuccess);
}
```

This routine, after error checking, first obtains a pointer func to the method which the current view's renderer has registered for geometry objects of the type to be rendered (in this case, polygons). If func is NULL, then a decomposition of the geometry object takes place in a manner hereinafter described. In the present case, however, the wire frame renderer has registered ErWF_Geometry_Polygon() as the procedure to render polygon objects. (See the discussion above with respect to ErWF_Register().) That procedure is set out in Appendix B.

D. Drawing Geometry Objects Which Require Decomposition

In the previous section, it was described how Escher causes a geometry object in a display group to be rendered in the situation where the view's renderer has a routine specifically for the geometry object's type (i.e., polygon). Renderers to be used with Escher must at least support routines which will render points, lines and triangles, and may also support routines which will render higher level geometries. In an aspect of the invention, the renderer need not support all geometry types which Escher supports in the building of a model. Rather, Escher will automatically detect the absence of a rendering method for a particular geometry type, and decompose the geometry into less complex parts. It then resubmits them to the renderer in this less complex form.

The wire frame renderer of the present embodiment supports polygon objects, but for purposes of illustration, it will now be assumed that it does not. This illustration is hypothetical also because the wire frame renderer's method for rendering triangles, which as will be seen is the geometry to which Escher decomposes polygons, is the same wire frame renderer procedure which renders polygons. That is, the renderer procedure ErWF_Geometry_Polygon() takes either a triangle or a polygon as an argument, determines which it is, and renders it using the same code. Nevertheless, the hypothetical will serve to illustrate Escher's decomposition technique.

1. Procedures Called On Escher Initialization

The procedure upon initialization for registering a renderer has been previously described. Classes and subclasses register themselves as well during initialization. The polygon class, for example, is registered initially by calling the following function:

```
Copyright © 1994 Apple Computer, Inc.
EtStatus EiPolygon_Register(
    void)
{
    EtObjectClassData objectClassData;
    EgPolygonClass =
        EiGeometryClass_Register(
            EiObjectClassData_Initialize(
                &objectClassData,
                EcGeometryType_Polygon, "Polygon",
                EiPolygon_MetaHandler, NULL,
                0))
    return ((EgPolygonClass == NULL) ? EcFailure:EcSuccess);
}
```

This routine creates the class method tables for an object in the polygon leaf class. As with other creation routines previously described, the block of memory is allocated and initialized using a layered technique, with each class's class registration procedure first passing the size required for its own method tables to its parent class's class registration procedure. The polygon class is a leaf class, so the size of its method table is zero. Above the polygon class, each procedure adds on the size of its own method table and recursively calls its parent class's class registration procedure. The ultimate parent class's class registration procedure allocates memory for the entire block of method tables, initializes its own portion with pointers to its default methods and returns to the calling subclass's class registration procedure. p On the way back down to the original caller, each class's class registration procedure initializes its own method table with its own default methods. In addition, each class's class registration procedure can specify methods to override those of its parent class, but only at the option of the parent class. This is accomplished by, when calling the parent class's class registration procedure, specify a metahandler and, for some classes, a virtual metahandler, as arguments to the call. These metahandlers can be called by the parent class's class registration procedure, if it so desires, specifying a method type, and if called, the metahandler returns a pointer to the procedure desired to override the parent class's default method of the type specified. If a class does not have a procedure to override the parent class's default method of a particular type, the metahandler returns NULL.

In the case of the polygon class registration procedure, only a metahandler is identified to the parent class's class registration procedure. The metahandler is as follows:

```
Copyright © 1994 Apple computer, Inc.
static EtFunctionPointer EiPolygon_MetaHandler(
    EtMethodType    methodType)
{
    switch (methodType) {
```

```
        case EcMethodType_ObjectDelete:
            return (EtFunctionPointer) EiPolygon_Delete;
        case EcMethodType_ObjectDuplicate:
            return (EtFunctionPointer) EiPolygon_Duplicate;
        case EcMethodType_BoundingBox:
            return (EtFunctionPointer) EiPolygon_BoundingBox;
        case EcMethodType_BoundingSphere:
            return (EtFunctionPointer) EiPolygon_BoundingSphere;
        case EcMethodType_GeometryRayPick:
            return (EtFunctionPointer) EiPolygon_RayPick;
        case EcMethodType_GeometryBoxPick:
            return (EtFunctionPointer) EiPolygon_BoxPick;
        case EcMethodType_GeometrySpherePick:
            return (EtFunctionPointer) EiPolygon_SpherePick;
        case EcMethodType_GeometryWindowPointPick:
            return (EtFunctionPointer) EiPolygon_WindowPointPick;
        case EcMethodType_GeometryWindowRectPick:
            return (EtFunctionPointer) EiPolygon_WindowRectPick;
        case EcMethodType_Decompose:
            return (EtFunctionPointer) EiPolygon_Decompose;
        case EcMethodType_DeleteDecomposition:
            return (EtFunctionPointer) EiPolygon_DeleteDecomposition;
        case EcMethodType_GetAttributeSet:
            return (EtFunctionPointer) EiPolygon_GetAttributeSet;
        case EcMethodType_SetAttributeSet:
            return (EtFunctionPointer) EiPolygon_SetAttributeSet;
        case EcMethodType_ObjectRead:
            return (EtFunctionPointer) EiPolygon_Read;
        case EcMethodType_ObjectWrite:
            return (EtFunctionPointer) EiPolygon_Write_Internal;
        case EcMethodType_ObjectTraverse:
            return (EtFunctionPointer) EiPolygon_Traverse;
        default:
            return (EtFunctionPointer) NULL;
    }
}
```

Of particular relevance to the present discussion, note that when asked for a geometry decomposition procedure, the metahandler returns one, namely EiPolygon_Decompose. This procedure is described hereinafter.

The class registration procedure for the polygon class's parent class, EtGeometryObject, is as follows:

```
Copyright © 1994 Apple Computer, Inc.
EtObjectClass EiGeometryClass_Register(
    EtObjectClassData    *objectClassData)
{
    EtObjectClass       objectClass;
    EiGeometryClass     *geomClass;
    EtObjectClassData   parentObjectClassData;
    objectClass =
        EiShapeClass_Register(
            EiObjectClassData_Add(
                EiObjectClassData_ParentInitialize(
                    &parentObjectClassData,
                    EcShapeType_Geometry,
                    "Geometry",
                    EiGeometryClass_MetaHandler,
                    EiGeometryClass_VirtualMetaHandler, NULL,
                    sizeof (EtGeometryClass)),
                objectClassData));
    if (objectClass == NULL) {
        return (NULL);
    }
    geomClass = EiShapeClass_GetSubClassMethods (objectClass,
                    EcShapeType_Geometry);
    /*
    * EgGeometryUniqueNumber is used in method tables in view
    */
    geomClass->geometryUniqueNumber = EgNumGeometryClasses;
    geomClass->boundingBox = (EtBoundingBoxMethod)
        EiObjectClassData_GetMethod(ObjectClassData,
            EcMethodType_BoundingBox);
    geomClass->boundingSphere = (EtBoundingSphereMethod)
        EiObjectClassData_GetMethod (objectClassData,
```

```
                    EcMethodType_BoundingSphere);
geomClass->rayPick = (EtGeometryPickMethod)
    EiObjectClassData_GetMethod (objectClassData,
                    EcMethodType_GeometryRayPick);
geomClass->boxPick = (EtGeometryPickMethod)
    EiObjectClassData_GetMethod (objectClassData,
                    EcMethodType_GeometryBoxPick);
geomClass->spherePick = (EtGeometryPickMethod)
    EiObjectClassData_GetMethod (objectClassData,
                    EcMethodType_GeometrySpherePick);
geomClass->windowPointPick = (EtGeometryPickMethod)
    EiObjectClassData_GetMethod(objectClassData,
                    EcMethodType_GeometryWindowPointPick);
geomClass->windowRectPick = (EtGeometryPickMethod)
    EiObjectClassData_GetMethod(objectClassData,
                    EcMethodType_GeometryWindowRectPick);
geomClass->decompose = (EtDecomposeMethod)
    EiObjectClassData_GetMethod (objectClassData,
                    EcMethodType_Decompose);
geomClass->deleteDecomposition = (EtObjectDisposeMethod)
    EiObjectClassData_GetMethod (objectClassData,
                    EcMethodType_DeleteDecomposition);
geomClass->getAttributeSet = (EtGetAttributeSetMethod)
    EiObjectClassData_GetMethod (objectClassData,
                    EcMethodType_GetAttributeSet);
geomClass->setAttributeSet = (EtSetAttributeSetMethod)
    EiObjectClassData_GetMethod(objectClassData,
                    EcMethodType_SetAttributeSet);
if (geomClass->decompose == NULL) {
    #ifdef VERBOSE
    EiWarning_Post (EcError_NoRecovery,
        EiWarning_Message(
        "% s: Geometry registered a NULL decompose function",
        "EiGeometry_Register"));
    #endif
}
if (geomClass->deleteDecomposition == NULL) {
    #ifdef VERBOSE
    EiWarning_Post (EcError_NoRecovery,
            EiWarning_Message(
    "% s: Geometry registered a NULL deleteDecomposition function",
                "EiGeometry_Register"));
    #endif
}
if (geomClass->rayPick == NULL) {
    #ifdef VERBOSE
    EiWarning_Post (EcError_NoRecovery,
                EiWarning_Message(
        "% s: Geometry registered a NULL ray pick function"
                "EiGeometry_Register"));
    #endif
    geomClass->rayPick = EiGeometry_DefaultPick;
}
if (geomClass->boxPick == NULL) {
    #ifdef VERBOSE
    EiWarning_Post (EcError_NoRecovery,
                EiWarning_Message(
                "% s: Geometry registered a NULL box
                pick function",
                "EiGeometry_Register"));
    #endif
    geomClass->boxPick = EiGeometry_DefaultPick;
}
if (geomClass->spherePick == NULL) {
    #ifdef VERBOSE
    EiWarning_Post (EcError_NoRecovery,
                EiWarning_Message(
                "% s: Geometry registered a NULL sphere
                pick function",
                "EiGeometry_Register"));
    #endif
    geomClass->spherePick = EiGeometry_DefaultPick;
}
if (geomClass->windowPointPick == NULL) {
    #ifdef VERBOSE
    EiWarning_Post (EcError_NoRecovery,
                EiWarning_Message("% s: Geometry
                registered a NULL
window point pick function",
                "EiGeometry_Register"));
    #endif
    geomClass->windowPointPick = EiGeometry_DefaultPick;
}
if (geomClass->windowRectPick == NULL) {
    #ifdef VERBOSE
    EiWarning_Post (EcError_NoRecovery,
            EiWarning_Message("% s: Geometry registered
            a NULL
window rect pick function",
                "EiGeometry_Register"));
    #endif
    geomClass->windowRectPick = EiGeometry_DefaultPick;
}
/*
 * Not legal to register NULL bbox method
 */
if (geomClass->boundingBox == NULL) {
    EiError_Post(EcError_NoRecovery,
            EiError_Message("% s: Geometry registered a
            NULL
bounding box function",
                "EiGeometry_Register"));
    geomClass->boundingBox =
            EiGeometry_DefaultBoundingBox;
}
if (geomClass->boundingSphere == NULL) {
    #ifdef VERBOSE
    EiWarning_Post (EcError_NoRecovery,
            EiWarning_Message("% s: Geometry registered
            a NULL
bounding sphere function",
                "EiGeometry_Register"));
    #endif
    geomClass->boundingSphere =
            EiGeometry_DefaultBoundingSphere;
}
EgGeometryClasses =
    EiMemory_Realloc(
        EgGeometryClasses,
        (EgNumGeometryClasses + 1) * sizeof (EtGeometryClass *));
if (EgGeometryClasses == NULL) {
    EiShapeClass_Unregister (objectClass);
    return (NULL);
}
EgGeometryClasses [EgNumGeometryClasses++] = objectClass;
if (EiObjectClass_FileMethodsExist(objectClass) == EcTrue)
{
    if (EiObjectClass_RegisterAttachmentMethod(
        objectClass,
        EcSetType_Attribute,
        EiGeometry_AttachAttributeSet) = EcFailure)
    {
        EiWarning_Post (EcError_InternalError,
                "Can't register geometry attachment");
    }
}
return (objectClass);
}
```

As can be seen, this procedure calls its own parent class's class registration procedure, EiShapeClass_Register(), specifying a metahandler and a virtual metahandler. After the recursion returns to the above procedure, the procedure continues by initializing its own method table with pointers to default procedures. It obtains these pointers using an Escher procedure, EiObjectClassData_GetMethod(), which among other things, asks the subclass's metahandler to provide the pointer to each desired method. One of the methods which the procedure asks the polygon class's metahandler to identify is a decomposition method, and as previously pointed out, the method which it identifies is EiPolygon_Decompose().

It is noteworthy that in Escher, the decomposition method is identified in the class method tables for each type of geometry, not for each renderer. Thus the decomposition methods are included as part of the model to be rendered, not as part of the view to which it will be rendered or as part of the renderer. It will be appreciated that in another embodiment, a renderer can be permitted to override the decomposition methods for geometry which it cannot draw directly. In yet another embodiment, the decomposition methods can be attached to the renderer subclass rather than to the geometry subclass.

A description of the geometry class's metahandler is not important for an understanding of the invention, but the geometry class's virtual metahandler is set out below:

```
Copyright © 1994 Apple Computer, Inc.
EtFunctionPointer EiGeometryClass_VirtualMetaHandler (
    EtMethodType methodType)
{
    switch (methodType) {
      case EcMethodType_ObjectUnregister:
        return ((EtFunctionPointer) EiGeometryClass_Unregister);
      case EcMethodType_ObjectDraw:
        return ((EtFunctionPointer) EiGeometry_Draw);
      default:
        return (NULL) ;
    }
}
```

Of particular relevance is that when called by the EtShapeObject class's class registration procedure, it will return a pointer to EiGeometry_Draw() as an object drawing procedure.

2. Procedures Called During Rendering

Returning to EiGeometry_DrawMethod() set out above, as previously mentioned, if the renderer has not registered a procedure for drawing geometries of the type provided to that procedure, which for the purposes of illustration we are assuming is the case with respect to polygons, then this routine will pass the geometry on to EiGeometry_Decompose(). That procedure is as follows:

```
Copyright © 1994 Apple Computer, Inc.
EtStatus EiGeometry_Decompose(
    EtGeometryObject   geometry,
    EtViewObject       view)
{
    EtGeometryClass        *theClass;
    theClass = (EiGeometryClass *)
      EiShape_GetSubClassMethods (geometry,
      EcShapeType_Geometry);
    EiAssert (theClass);
    if (!theClass->decompose) {
    /*
     * Some geoms can't be decomposed (e.g., lines, triangles).
     * If this code path is hit, that means that somebody is
     * trying to decompose a primitive that ought not be
     * decomposed (or cannot). Unless a picking or bounding box
     * routine is erroneously trying to decompose a point, line,
     * triangle, or marker, then it must be that a renderer is
     * not providing a pipeline for the geometric primitive in
     * question. This is an error . . .
     */
      EiError_Post(
        EcError_Unimplemented,
        EiError_Message(
          "% s: Renderer does not support a required geometric
    primitive.",
          "EiGeometry_Decompose"));
      return (EcSuccess);
    }
    EiAssert(theClass->decompose);
    return ((*theClass->decompose) (geometry, view));
}
```

As can be seen, after some error checking, this procedure merely passes the geometry object on to the method identified in its method table for a decomposition procedure. For polygons, this method was previously registered as described above as EiPolygon_Decompose, which is as follows:

```
Copyright © 1994 Apple Computer, Inc.
static EtStatus EiPolygon_Decompose(
    EtGeometryObject    polygon,
    EtViewObject        view)
{
    EtPolygonPrivate    *polygonPriv;
    EtBoolean           immediateMode = EcFalse;
    if (!(polygonPriv = EiPolygon_GetPolygon (polygon))) {
      return (EcFailure);
    }
    if (immediateMode) {
      if ((EiPolygon_Triangulate(polygon, EcFalse, NULL, view)) ==
                EcFailure) {
        return (EcFailure);
      }
    } else {
      if (!polygonPriv->decomposition) {
        if ((EiPolygon_Triangulate (polygon,
              EcTrue,
              &polygonPriv->decomposition,
              view)) == EcFailure) {
          return (EcFailure);
        }
      }
      if ((EiGeometry_Draw(polygonPriv->decomposition, view)) ==
                EcFailure) {
        return (EcFailure);
      }
    }
    return (EcSuccess);
}
```

The above procedure uses an Escher procedure EiPolygon_Triangulate() to decompose the polygon into a bundle of triangles. In one embodiment, the triangulation procedure could create a new EtGroupObject to hold all of the new triangles. Preferably, however, in order to short-circuit a level of error checking and recursion, since it is already known that all objects within the group will be geometry objects, the triangulation procedure places all of the new triangles in an object of class EtGeometryBundle. A geometry bundle is an internal-only geometry object which can hold only a list of geometries.

The above procedure can operate either in immediate mode or in retained mode. In immediate mode, it calls the triangulation procedure with a flag that tells the triangulation procedure not to save the result of the decomposition, but rather to simply have it drawn. In retained mode, the above procedure calls the triangulation procedure with a flag indicating that the decomposition should be saved, as well as with a reference to a field in which to save it. In the above procedure, the field into which the triangulation procedure writes a reference to the resulting geometry bundle object, is polyPriv->decomposition, which the above procedure then passes to EiGeometry_Draw().

EiGeometry_Draw() has been set out above, and in the manner previously described, after error checking, it merely calls the method identified in the method table of the geometry object passed to it, for drawing that type of geometry. Usually these will be methods registered by the renderer, but geometry bundle objects are not public. Renderers do not register routines to draw these objects. Instead, the method table will contain a pointer to Escher's default drawing method for geometry bundles, which is as follows:

```
Copyright © 1994 Apple Computer, Inc.
void EiView_GeometryBundle(
```

```
        EtGeometryObject           geometry,
        EtViewObject               view)
    {
        EtGeometryBundlePrivate    *bundle;
        long                       i;
        if (!(bundle = (EtGeometryBundlePrivate *)
                EiGeometry_GetSubClassData(geometry,
                    EcGeometryType_GeometryBundle))) {
            return;
        }
        for (i = 0; i < bundle->numGeometries; i++) {
            EiGeometry_Draw(bundle->geometries[i], view);
        }
    }
```

As can be seen, this procedure merely iterates through the list of geometry objects in the geometry bundle object provided to it, and passes each one in turn to EiGeometry_Draw(). These are all triangles, so EiGeometry_Draw() will call the renderer's triangle drawing procedure for each triangle in the decomposition.

E. Drawing Transform Objects in a Display Group Object

The Escher procedure which EiView_OrderedDisplayGroup() identifies to the list drawing routine for transform objects is EiTransform_Draw(), which is as follows:

```
Copyright © 1994 Apple Computer, Inc.
EtStatus EiTransform_Draw(
        EtTransformObject         t,
        EtViewObject              viewObject)
{
    EtViewPrivate *view;
    view = EiView_GetView(viewObject);
    return ((*view->rendererClass->transformDrawMethod)
                (t, viewObject));
}
    As can be seen, the above procedure merely calls the
    transform draw method for the EtTransformObject class.
    This method is generic to all transform objects, and is
    as follows:
Copyright © 1994 Apple Computer, Inc.
static EtStatus EiTransform_DrawMethod(
        EtTransformObject         t,
        EtViewObject              viewObject)
{
    void (*func) (
        EtTransformObject         transform,
        EtViewObject              viewObject);
    EtViewPrivate *view;
    view = EiView_GetView(viewObject);
    EiView_CheckStarted(view, "EiView_Transform");
    func = EiMethodTable_GetMethod
            (view->rendererClass->transformDrawMethods,
                EiTransform_GetTypeIndex(t));
    if (func) {
        (*func) (t, viewObject);
    }
    return (Ecsuccess);
}
```

This routine, after error checking, first obtains a pointer func to the method which the current view's renderer's method table has for executing transform objects of the type to be executed (in this case, translations). Escher's default procedure for executing translation transforms is as follows:

```
Copyright © 1994 Apple Computer, Inc.
void EiView_Translate(
        EtTransformObject         trans,
        EtViewObject              viewObject)
{
    EtTranslatePrivate            *t;
    EtViewTransformState          *newState, *state;
    EtViewPrivate                 *view;
    view = EiView_GetView(viewObject)
    if (!(t = (EtTranslatePrivate *)
            EiTransform_GetSubClassData (trans,
                EcTransformType_Translate))) {
        return;
    }
    if (EiAttributeStack_Check(
            view->renderer->transforms->stackTransformation)) {
        newState = EiMemory_New(sizeof(EtViewTransformState));
        if (!newState) {
            return;
        }
    }
    /* indicates that inverse etc has not been calculated */
    newState->flags = 0;
    /*   We want new = translate * current */
    state = (EtViewTransformState *) EiAttributeStack_GetTop(
                view->renderer->transforms->stackTransformation);
    EiMatrix4x4_Copy(&state->localToWorldMatrix,
                        &newState->localToWorldMatrix);
    {
        EtMatrix4x4          tmp;
        EiMatrix4x4_SetTranslate(&tmp,
                    t->translate.x,
                    t->translate.y,
                    t->translate.z);
        EiMatrix4x4_Multiply(&tmp,
                    &newState->localToWorldMatrix,
                    &newState->localToWorldMatrix);
    }
    EiAttributeStack_Push(
            view->renderer->transforms->stackTransformation,
            (void *)newState,
            EiView_Transformation_Pop);
} else {
    /* We want current = translate * current */
    state = (EtViewTransformstate *) EiAttributeStack_GetTop(
                view->renderer->transforms->stackTransformation);
    {
        EtMatrix4x4          tmp;
        EiMatrix4x4_SetTranslate (&tmp,
                    t->translate.x,
                    t->translate.y,
                    t->translate.z);
        EiMatrix4x4_Multiply (&tmp,
                    &state->localToWorldMatrix,
                    &state->localToWorldMatrix);
    }
    /* indicates that inverse etc has not been calculated */
    state->flags =0;
}
/* notify renderers that current tmsfrmatn matrix has changed */
EiView_Transform_StateChanged(
        viewObject,
        EcViewStateType_Transform_LocalToWorldMatrix);
}
```

V. MANAGING AND USING QUALITY COLLECTIONS

A. Data Structures

Figure 11:
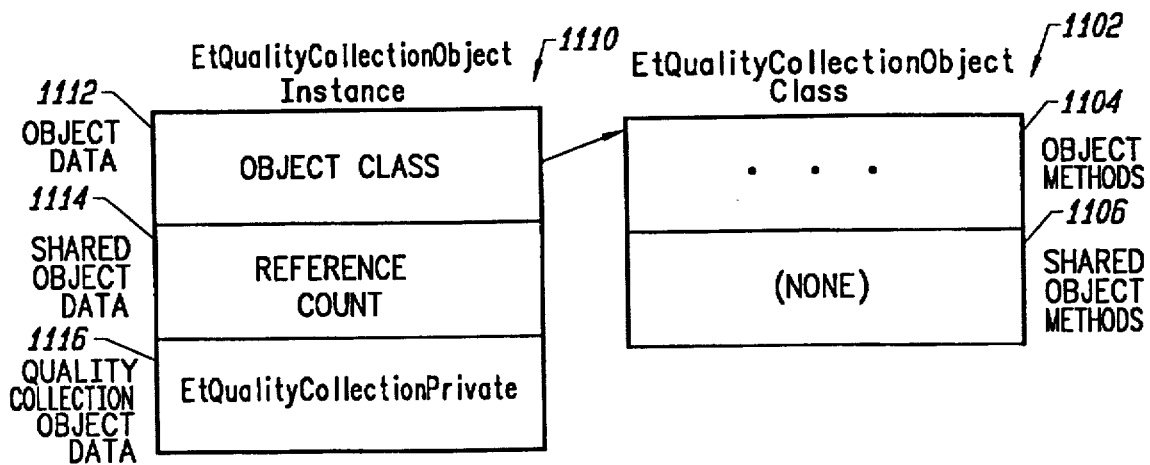

A quality collection object is a data structure which contains a linked list of quality group objects. A quality collection object is an instance of the class EtQualityCollectionObject which, as indicated in FIG. 6, is a subclass of the class EtSharedObject, which is itself a subclass under the class Etobject. Accordingly, following the format of FIG. 5, a quality collection object has the format in memory as illustrated in FIG. 11. Specifically, a region of memory 1102 is allocated to contain pointers to the methods of the EtQualityCollectionObject class, and this region 1102 contains pointers 1104 to object methods and pointers 1106 to shared object methods (of which there are none). EtQualityCollectionObject class is a leaf class, so the class omits a method table specifically for quality collection object methods.

The structure also includes instance data for the quality collection object in region 1110 memory. This region contains instance data specific the object class in a portion 1112 (pointing to the object class 1102), instance data specific to the shared object class in a portion 1114 (containing a reference count), and instance data specific to the quality collection object class in a portion 1116. The quality collection object data is a data structure of type EtQualityCollectionPrivate, which begins a linked list of quality group objects.

Figure 12:
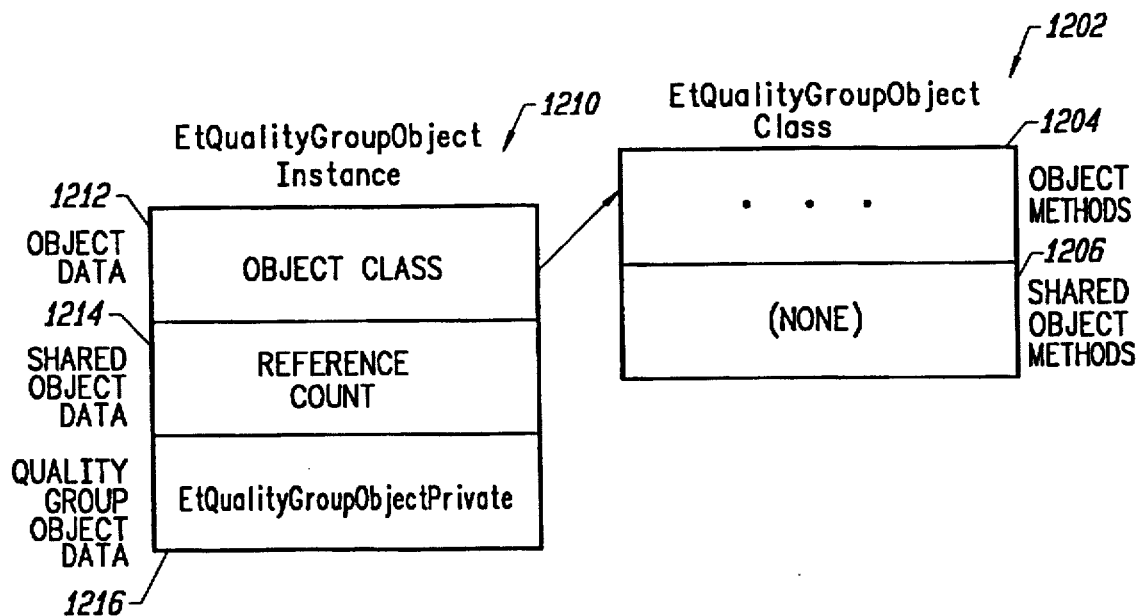

A quality group object is a data structure which contains a group of quality control type variables, each containing a value which itself selects among two or more options in a respective trade-off between rendering quality and rendering speed. A quality group object is an instance of the class EtQualityGroupObject which, as indicated in FIG. 6, is a subclass of the class EtSharedObject. A quality group object has the format illustrated in FIG. 12. Specifically, a region of memory 1202 contains pointers to the methods of the EtQualityGroupObject class, and this region 1202 contains pointers 1204 to object methods and pointers 1206 to shared object methods (of which there are none). The structure also includes instance data for the quality group object in region 1210 of memory. This region contains instance data specific to the object class in a portion 1212 (pointing to the object class 1202), instance data specific to the shared object class in a portion 1214 (containing a reference count), and instance data specific to the quality group object class in a portion 1216. The quality group object data is a data structure of type EtQualityGroupObjectPrivate, which includes the fields set forth in Table I.

TABLE I

| EtQualityGroupObjectPrivate | |
|---|---|
| FIELD | DATA TYPE |
| Quality Index | float |
| Pointer to Previous EtQualityGroupObjectPrivate in Collection | pointer |
| Pointer to Next EtQualityGroupObjectPrivate in Collection | pointer |
| List of Quality Type Entries | struct |

As can be seen, apart from the linked list pointers for other quality group objects in the quality collection object, the quality group object includes a field for storing a quality index value associated with the particular group. In one embodiment, the quality index is of type float and can range from 0.0 to 1.0, but in other embodiments the quality index value can be, for example, an integer. Note that whereas, in the presently described embodiment the quality index value is stored in a field in the quality group object, in another embodiment, the quality index associated with a particular quality group may be simply a calculated value such as, for example, n/N, where n is the position of the particular quality group in the collection's linked list, and N is the total number of quality groups in the collection. In yet another embodiment, the quality index associated with a particular quality group is merely n, where the particular quality group is the n'th quality group in a collection's list of quality groups. Many other techniques can be used in different embodiments for associating a quality index value with respective quality groups.

Referring again to Table I, each quality group object also includes a list of quality type entries. The quality type entries are a set of variables, each containing a value which selects among at least two options in a respective trade-off between rendering quality and rendering speed. For one embodiment, Table II sets forth the different quality control variables and the different options which are available for that parameter.

TABLE II

| QUALITY TYPE PARAMETERS | |
|---|---|
| FIELD | OPTIONS |
| Line Style | on, off |
| Shaders | off, fast, on |
| Illumination | off, fast, on |
| Level of Detail | on, off |
| Compute Shadows | on, off |
| Compute Transparency | off, fast, on |
| Compute Reflections | on, off |
| Backfacing Removal | on, off |
| Interpolation | flat, gouraud, phong |
| Progressive Refinement | on, off |
| Antialiasing Level | float (0.0–1.0) |
| Ray Depth | integer |

It will be appreciated that different embodiments can include a different set of parameters in each quality group and/or can include different options for each parameter in the table.

B. Procedures for Establishing a Quality Collection

Figure 13:
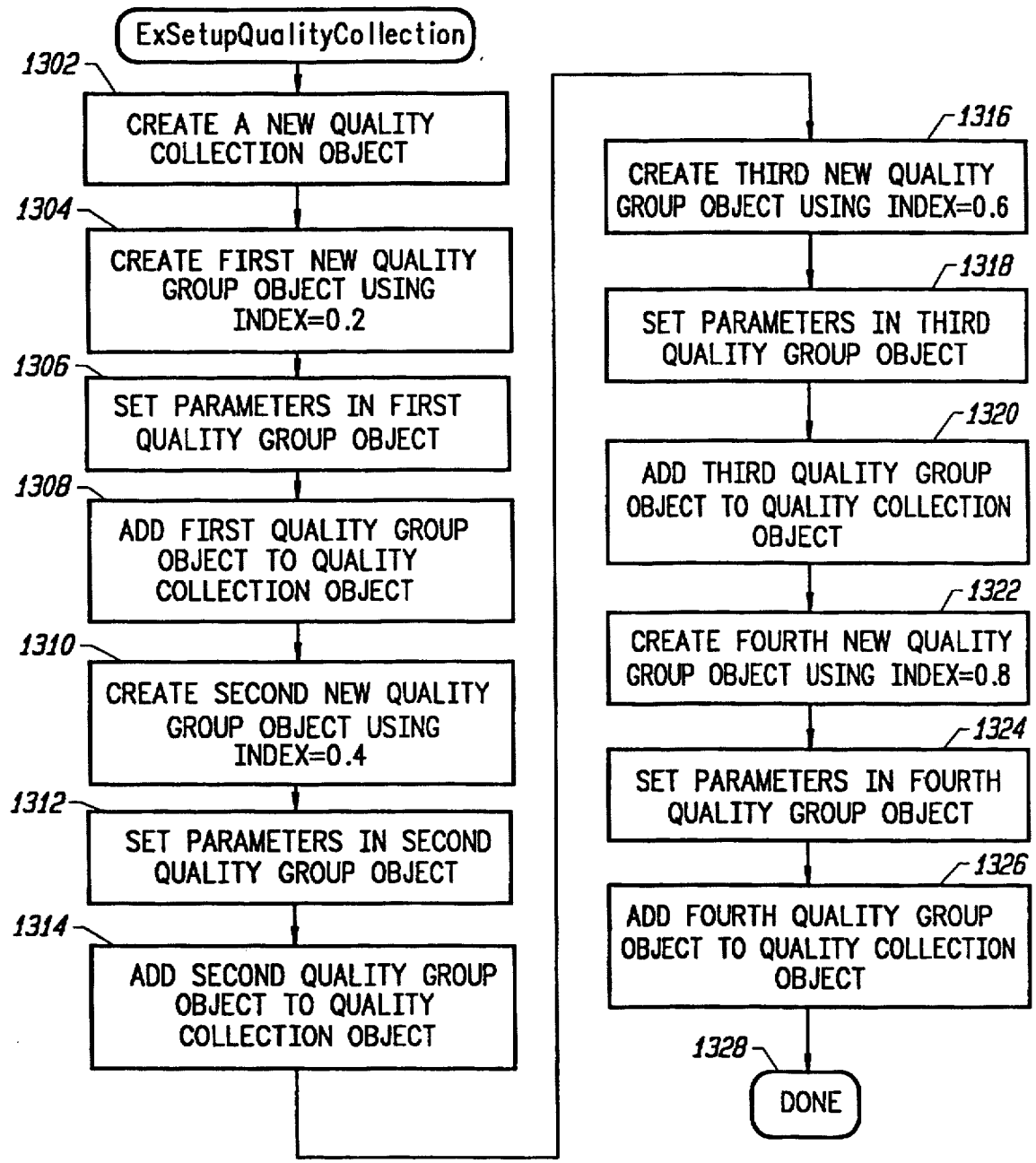
FIG. 13 is a flowchart of an application program procedure to set up a quality collection.

Referring to Appendix A, the example application program establishes a quality collection by calling a procedure ExSetupQualityCollection(&qualityCollection). This procedure, which is part of the application program, uses Escher-provided procedures to build a collection of quality groups in a desired manner. FIG. 13 is a flow chart of an ExSetupQualityCollection() procedure which establishes a quality collection having four quality groups, with quality indices 0.2, 0.4, 0.6 and 0.8, respectively.

Referring to FIG. 13, in a step 1302, the routine first creates a new quality collection object. This is accomplished with a call to an Escher procedure ErQualityCollectionobject_New(), which allocates space and initializes the data structures in the same manner as described above with respect to FIG. 10. ErQualityCollectionObject_New() returns a pointer to the new quality collection object, which the procedure of FIG. 13 stores in a variable qualitycollection.

In a step 1304, the procedure of FIG. 13 creates a new quality group object using an Escher routine ErQualityGroup_New(qualityIndex), with qualityIndex= 0.2. This routine allocates memory space for the new quality group object using the technique of FIG. 10, and initializes the quality index field of the quality group to 0.2.

In the presently described embodiment, the call to procedure ErQualityGroupObject_New() sets the quality index for the new group permanently. When the group object is later added to a quality collection, the Escher procedure which does so (described below) places the new group in the collection's linked list in the appropriate sequence determined by the quality index of the quality group. If the quality index of the group to be added duplicates the quality index of a group already in the collection, then an error is returned.

In another embodiment, ErQualityGroupObject_New() does not take an argument, but rather initializes the quality index field of the new group at a null value. Escher routines are provided for the application program to set the quality index of the group subsequently as desired.

Returning to FIG. 13, after the first new quality group is created, the application program sets the parameters in the first group as desired in step 1306. In the presently described embodiment, each of the quality type parameters set forth in Table II above is assigned a unique four-character code of type EtQualityType. In order to allow for future enhancements, application programs do not read and write the parameter values directly, but rather do so only through certain Escher routines. Moreover, application programs can use the Escher routines to determine which quality parameters are supported by the particular version of Escher. Quality type codes are registered with Apple Computer, Inc., are available to application program developers, and are consistent through subsequent upgrades of Escher.

The Escher routines set forth in Table III are used by the application program to manage the contents of a quality group.

TABLE III

QUALITY GROUP MAINTENANCE ROUTINES

| Escher Routine | Comments |
|---|---|
| EtStatus ErQualityGroup_GetFirstType( EtQualityGroupObject qualityGroup, EtQualityType *qualityType); | Returns 4-character name of first "type" in the specified quality Group. Return value in qualityType. |
| EtStatus ErQualityGroup_GetNextType( EtStatus ErQualityGroup_GetTypeData( EtQualityGroupObject qualityGroup, EtQualityType *qualityType); EtQualityGroupObject qualityGroup, EtQualityType qualityType, void *data); | Returns 4-character Gets the Group's name of next "type" in the specified quality Group. value for the quality type qualityType (e,g, antialiasing level). Data is returned into structure "data". Returns error if the Group has no entry for the specified quality type. |
| EtStatus ErQualityGroup_SetTypeData( EtQualityGroupObject qualityGroup, EtQualityType qualityType, void *data); | Sets the value for the quality type qualityType in the specified quality group. Returns error if the Group has no entry for the specified quality type. |
| EtStatus ErQualityGroup_GetQualityIndex( EtQualityGroupObject qualityGroup, float *qualityIndex); | Gets the quality index value associated with the quality group specified in qualityGroup, and returns the value in qualityIndex. |

The routine to get the quality index associated with a particular quality group is provided as an independent routine because the quality index value is not one of the quality types which are accessible using ErQualityGroup_GetTypeData() and ErQualityGroup_SetTypeData(). In another embodiment, however, the index value associated with a particular quality group can be included as one of the quality types which are accessible using these routines.

In step 1308, the procedure of FIG. 13 adds the first quality control group object to the quality collection object created in step 1302. This is accomplished using an Escher procedure ErQualityCollection_AddGroup() procedure, which is one of several quality collection maintenance procedures described in Table IV.

TABLE IV

QUALITY COLLECTION MAINTENANCE ROUTINES

| Escher Routine | Comments |
|---|---|
| EtStatus ErQualityCollection_GetFirstGroup( EtQualityCollectionObject qualityCollection, EtQualityGroupObject *qualityGroup); | Returns in qualityGroup a pointer to the quality group in the specified quality collection. |
| EtStatus ErQualityCollection_GetNextGroup( EtQualityCollectionObject qualityCollection, EtQualityGroupObject *qualityGroup); | Returns in qualityGroup a pointer to the next quality group in the specified quality collection. |
| EtStatus ErQualityCollection_AddGroup( EtQualityCollectionObject qualityCollection, EtQualityGroupObject, *qualityGroup); | Adds the specified quality group to the specified quality collection. Automatically places the new quality group in sorted order in the quality collection linked list according to the quality index. Returns an error if the quality index of the new quality group is already associated with another group in the collection. |
| EtStatus ErQualityCollection_DeleteGroup( EtQualityCollectionObject qualityCollection, EtQualityGroupObject *qualityGroup); | Deletes the specified quality group from the specified quality collection. Since quality groups are shared objects, this procedure merely decrements the reference count, actually deleting the object and de-allocating memory only if the resulting reference count is zero. |

As can be seen, the routine ErQualityCollection_AddGroup() automatically adds the new quality group to the collection in sorted order according to the quality index. If the quality index of the new group is already associated with another group in the collection, an error is returned. However, in another embodiment, the Escher routines may be written to accommodate the possibility of two or more quality groups having the same quality index in a single quality collection. Also, as previously mentioned, other embodiments are possible in which the application program can change the quality index associated with a group as desired. In such an embodiment, if the quality index is already assigned to a group in one or more quality collection objects, it will be appreciated that certain bookkeeping functions may need to be performed in order to maintain each affected quality collection in sorted order, and/or in order to handle duplicate quality indices in the same quality collection.

Returning to FIG. 13, after the first quality group object has been added to the quality collection object, the procedure creates a second new quality group object in step 1310, this time using a quality index of 0.4. In step 1312, the procedure sets the parameters in the second quality group object as desired, and in step 1314, it adds the second quality group object to the quality collection object in the manner previously described.

In steps 1316, 1318 and 1320, a third quality group object, with a quality index of 0.6, is created, modified as desired and added to the quality group object, respectively. Similarly, in steps 1322, 1324 and 1326, a fourth new quality group object is created, using a quality index of 0.8, the parameters are set appropriately in the fourth quality group object, and it is added to the quality collection object in the manner previously described. This completes the application program procedure ExSetupQualityCollection() (step 1328).

It will be appreciated that in another embodiment, instead of requiring each application program to set up its own quality collection, the Escher routines may provide a procedure merely for creating a default quality collection. Such a default quality collection may be predefined to include four or five quality groups, each filled with quality type values such that the overall progression from the quality group with the lowest quality index to the quality group with the highest quality index, follows a monotonically increasing overall quality and a monotonically decreasing overall speed in the overall quality/speed trade-off continuum.

It will also be appreciated that for the rendering of some images, a first quality group having a first set of quality type values may render with a higher quality and lower speed than it would with a second group having a second set of quality type values, whereas a different image may be rendered at lower quality and higher speed with the first quality group and at higher quality and lower speed with the second quality group. Renderings performed with different renderers may also experience this same kind of reversal. Because of these possibilities, the Escher routines do not enforce any arbitrary conception of which permutations of quality type values should be associated with a lower or higher quality index. The application program is free to establish any desired set of quality type values in a given quality group, regardless of the quality index value associated with such quality group. It will be appreciated that in another embodiment, such a relationship may in fact be enforced.

C. Procedures for Selecting and Getting a Quality Group

Figure 14:
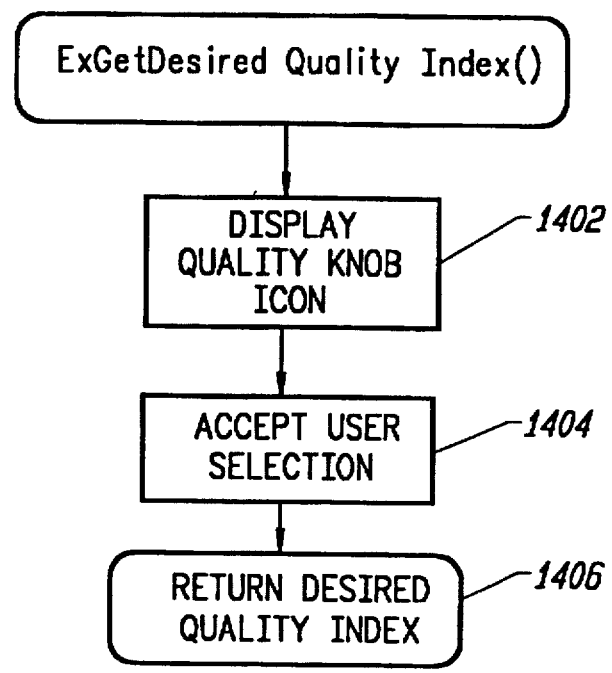
FIG. 14 is a flowchart of an application program procedure for obtaining a desired quality index.
Figure 15:
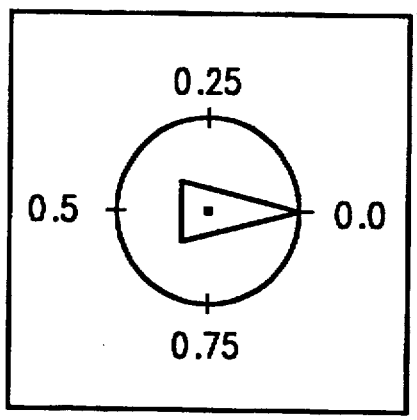
FIG. 15 is an illustration of a display icon.

An advantage to having several quality groups in a collection, each associated with a respective quality index value, is that an application program can ask a user to choose a desired point in the rendering quality/speed trade-off using an intuitively appropriate mechanism. Referring again to the example program in Appendix A, this application program does so using an application program routine ExGetDesiredQualityIndex(). FIG. 14 is a flow chart illustrating the major steps in such procedure. Referring to FIG. 14, in a step 1402, the procedure displays a quality knob icon. Such an icon is illustrated in FIG. 15, and as can be seen, it looks like a knob. It has a needle which is currently pointing to a quality index value 0.0, and the user can click on the point of the needle and drag the needle rotationally around the circle to choose any desired quality index from 0.0 through almost 1.0. In one embodiment, the available positions on the knob are continuous, allowing the user to select a quality index with the full granularity of the binary register in which it is stored. In another embodiment, only discrete values may be selected.

Returning to FIG. 14, in step 1404, the procedure accepts the user's quality index selection. In step 1406, the desired quality index is returned to the calling routine.

The renderer is made aware of the selected quality group by having it attached to either the renderer object in one embodiment, or to the view object, in another embodiment. In the presently described embodiment, it is attached to the view object. Escher provides the routines in Table V for selecting and getting a quality group object.

TABLE V

ROUTINES FOR SELECTING AND GETTING QUALITY GROUPS

| Escher Routine | Comments |
|---|---|
| EtStatus ErView_SelectQualityGroup( EtViewObject view, EtQualityCollectionObject qualityCollection, float desiredQualityIndex); | Selects a quality group from the specified quality collection in response to the quality index specified in desiredQualityIndex. If the specified quality index does not match the index associated with any quality group in the quality collection, then this routine chooses the quality group with the nearest quality index. |
| EtStatus ErView_GetQualityGroup( EtViewObject view, EtQualityGroupObject *qualityGroup); | Returns in qualityGroup a pointer to the quality group object currently selected in the specified view object. This procedure can be used by the application program to manage individual values in a quality group. This procedure, or one like it, can also be used by a renderer as a prelude to obtaining the individual quality type values in response to which it will adjust its rendering procedures. |

The example application program in Appendix A uses the Escher routine ErView_SelectQualityGroup() to select to the view object, the quality group whose quality index matches, or is nearest to, that specified by the user. It will be appreciated that different embodiments can use different rounding functions for the situation where the desired quality index does not match that associated with any of the quality groups in the quality collection. In the present embodiment, the quality collection with the nearest quality index value is selected; if the quality indices associated with two quality groups are equally different from the desired quality index, then the group with the higher quality index is selected. In another embodiment, the desired quality index is always rounded up, and in yet another embodiment, the desired quality index is already rounded down.

D. Renderer Procedures

Figure 16:
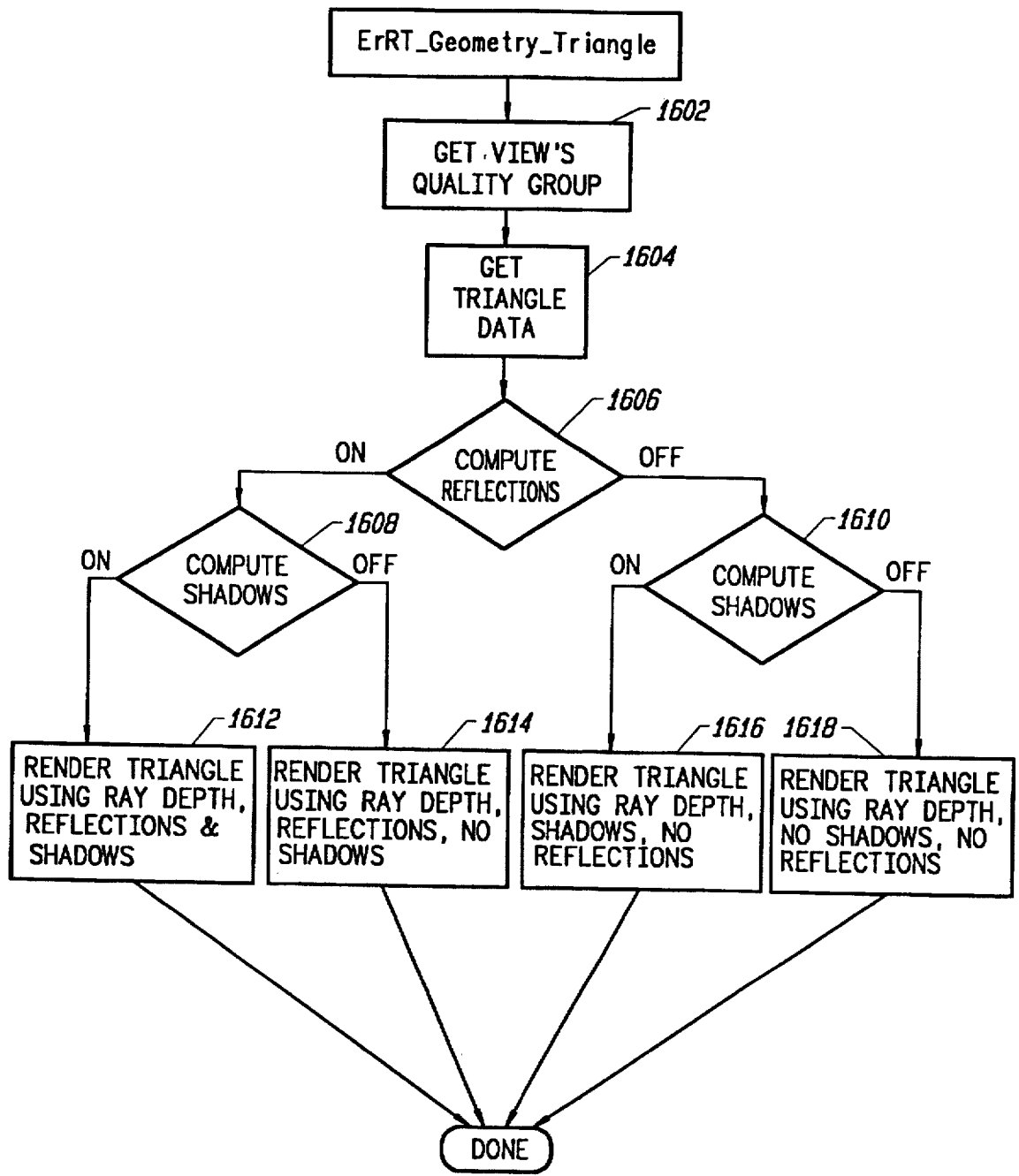
FIG. 16 is a flowchart of a procedure in a renderer.

Each renderer, when called on to render a shape to a specified view, does so in response to the individual values of the quality types in the quality group currently assigned to the view object. Different renderers can choose to respond to different ones of the quality type parameters and to ignore the others. FIG. 16 is a flow chart of pertinent aspects of a ErRT_Geometry_Triangle() procedure of a ray-tracer renderer for rendering a triangle.

Referring to FIG. 16, in step 1602, the procedure uses the above-identified Escher procedure ErView_GetQualityGroup(), or one like it, to obtain a pointer to the quality group currently assigned to the view. In step 1604, the procedure obtains the data for the triangle to be rendered to the view. In steps 1606, 1608 and 1610, the procedure looks up the values of two different quality type parameters in the current quality group in order to determine which variation of the triangle rendering procedure should be used. Specifically, in step 1606, using the Escher procedure ErQualityGroup_GetTypeData(), the procedure obtains the value for the quality type parameter, "compute reflections". If the value is "on", which represents a higher-quality/lower-speed choice, then control passes to step 1608. If "compute reflections" is "off", then control passes to step 1610.

Step 1608 next determines the value of the "compute shadows" quality type parameter in the current quality group. If "compute shadows" is "on", then in a step 1612, the procedure renders the triangle using the value for the quality type parameter "ray depth", using reflections and using shadows. If "compute shadows" is "off", then the procedure renders the triangle using the specified ray depth, using reflections, but no shadows (step 1614).

If "compute reflections" was "off", then in step 1610, the procedure makes a similar determination to step 1608. If "compute shadows" is "on", then in step 1616, the procedure renders the triangle using the specified ray depth, computing shadows, but not computing any reflections. If "compute shadows" is "off" in step 1610, then in step 1618, the procedure renders the triangle using the specified ray depth, but without computing any shadows or reflections.

It can be seen that, for simplicity, the renderer procedure of FIG. 16 responds only to the "ray depth", "compute reflections" and "compute shadows" quality type parameters in the current quality group object. However, other renderers can respond to many more of the quality type parameters, as may be appropriate for the particular kind of renderer.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

- 116 -

APPENDIX A

Example Application Program

Copyright © 1994 Apple Computer, Inc.

```
/******************************************************************
 *                                                                **
                                                               
    Module:      example2.c                                    
                                                               
                                                               
    Purpose:  Simple Escher example program.                   
                                                               
 ******************************************************************
 */ include <stdlib.h> include "Escher.h"
include "EscherSystem.h"
#include "View.h"
#include "Group.h"
#include "Object.h"
#include "PixmapDrawContext.h"
#include "Transform.h"
#include "Geometry_Polygon.h"
#include "Geometry_Line.h"
#include "Geometry_Torus.h"
#include "EscherColor.h"
#include "EscherMath.h"
#include "Camera.h"
#include "Style.h"

void main(
    void)
{
    EtViewObject             view;
    EtGroupObject            group;
    EtQualityCollectionObject    qualityCollection;
    EtQualityGroupObject         qualityGroup;
    float                        desiredQualityLevel;

/*
     * Initialize Escher
     */
    ErInitialize();

/*
     * Establish a Quality Collection
     */
    ExSetupQualityCollection(&qualityCollection);

/*
     * Create a view.  A view associates:
     * 1. What you're drawing to (a window, a pixel map, etc.).
     * 2. The renderer you're drawing with (wireframe, zbuffer,
    etc.)
     * 3. What you're drawing (groups, polygons, etc.)
```

- 117 -

```
     *  4. The camera you're using.
     *  5. Lights (none used here)
     *  6. A desired rendering quality/speed tradeoff.
     *
 5   */
     view = ErView_New();

/*
      *  Associate a renderer with the view.
10    */
     ErView_SetRendererByType(view, EcRendererType_WireFrame);

/*
      *  Create a camera for the view, and attach to view.
15    */
     {
         EtViewAngleAspectCameraData    perspectiveData;
         EtCameraObject                 camera;

20       EtPoint3D      from         = { 0.0, 0.0, 1.0 };
         EtPoint3D      to           = { 0.0, 0.0, 0.0 };
         EtVector3D     up           = { 0.0, 1.0, 0.0 };

float          fieldOfView  = 10.0;
25       float          hither       =  0.5;
         float          yon          =  1.5;

perspectiveData.cameraData.placement.cameraLocation = from;
         perspectiveData.cameraData.placement.pointOfInterest = to;
30       perspectiveData.cameraData.placement.upVector        = up;

perspectiveData.cameraData.range.hither        = hither;
         perspectiveData.cameraData.range.yon           = yon;

35       perspectiveData.cameraData.viewPort.origin.x   = -1.0;
         perspectiveData.cameraData.viewPort.origin.y   =  1.0;
         perspectiveData.cameraData.viewPort.width      =  2.0;
         perspectiveData.cameraData.viewPort.height     =  2.0;

40       perspectiveData.fov                            = fieldOfView;
         perspectiveData.aspectRatioXToY                = 1.0;

camera = ErViewAngleAspectCamera_NewData(&perspectiveData);

45       /*
          *  Attach to view
          */
         ErView_SetCamera(view, camera);

50       /*
          *  Get rid of application's copy of camera, as the view
          *  now has it.
          */
         ErObject_Dispose(camera);
55   }

/*
      *  Create a pixmap DrawContext to draw to, and associate
      *  it with the view.
60    */
     {
```

- 118 -

```
        EtDrawContextObject         drawContext;
        EtDrawContextData          drawContextData;
        EtPixmap                   pixmap;
        EtPixmapDrawContextData    pixmapData;
        EtColorRGB                 clearColor;

ErColorRGB_Set(&clearColor, 0.5, 0.5, 0.8);

drawContextData.clearImageState    = EcTrue;
        drawContextData.clearImageMethod   = EcClearWithColor;
        drawContextData.clearImageColor    = clearColor;
        drawContextData.paneState          = EcFalse;
        drawContextData.maskState          = EcFalse;
        drawContextData.doubleBufferState  = EcFalse;
        drawContextData.activeBuffer       = EcFrontBuffer;

pixmap.image     = malloc(512 * 512 * 4);
        pixmap.width     = 512;
        pixmap.height    = 512;
        pixmap.rowBytes  = 2048;
        pixmap.pixelSize = 32;
        pixmap.pixelType = EcPixelType_RGB24;
        pixmap.bitOrder  = EcEndian_Big;
        pixmap.byteOrder = EcEndian_Big;

pixmapData.drawContextData = drawContextData;
        pixmapData.pixmap          = pixmap;

/*
         * Create the draw context
         */
        drawContext = ErPixmapDrawContext_NewData(&pixmapData);

/*
         * Attach the draw context to the view
         */
        ErView_SetDrawContext(view, drawContext);
        ErObject_Dispose(drawContext);
    }
    /*
     * Set a quality level in the view
     */
    desiredQualityIndex = ExGetDesiredQualityIndex();
    ErView_SelectQualityGroup(
        view, qualityCollection, desiredQualityIndex);

/*
     * Create a group to put the geometric objects & transform in.
     */
    group = ErOrderedDisplayGroup_New();

/*
     * Create a style and add it to the group. Here, we tell
     * the renderer to not draw the parts of objects that face
     * away from the camera.
     */
    {
        EtStyleObject backfacingStyle;

backfacingStyle = ErBackfacingStyle_New(
```

```
            EcBackfacingStyle_RemoveBackfacing);
        ErGroup_AddObject(backfacingStyle);
        ErObject_Dispose(backfacingStyle);
    }
    /*
     * Create a polygon and add it to the group
     */
    {
        EtGeometryObject    polygon;
        EtPolygonData       polygonData;
        static EtVertex3D vertices[3] = {
                                { { 0, 0, 0 }, NULL },
                                { { 1, 0, 0 }, NULL },
                                { { 0, 1, 0 }, NULL },
                        };

polygonData.vertices            = vertices;
        polygonData.numVertices         = 3;
        polygonData.polygonAttributeSet = NULL;

/*
         * Create polygon object
         */
        polygon = ErPolygon_NewData(&polygonData);

/*
         * Add polygon object to group object
         */
        ErGroup_AddObject(group, polygon);

/*
         * Dispose local reference to polygon - the group
         * will retain its own copy of (i.e., reference to)
         * the object.
         */
        ErObject_Dispose(polygon);
    }
    /*
     * Create a line and add it to the group
     */
    {
        EtGeometryObject    line;
        EtLineData          lineData;

ErPoint3D_Set(&lineData.vertices[0].point, 2, 2, 0);
        lineData.vertices[0].attributeSet = NULL;

ErPoint3D_Set(&lineData.vertices[1].point, 2, 5, 0);
        lineData.vertices[1].attributeSet = NULL;

lineData.lineAttributeSet   = NULL;

/*
         * Create line object
         */
        line = ErLine_NewData(&lineData);

/*
         * Add line object to group object
```

- 120 -

```
          */
          ErGroup_AddObject(group, line);

/*
5          * Dispose local reference to line - the group
           * will retain its own copy of (i.e., reference to)
           * the object.
           */
          ErObject_Dispose(line);
10      }

/*
         * Create a translation transform and add it to the group
15       */
        {
            EtTransformObject  transform;
            EtPoint3D          transformData;

20          /*
             * Specify translation amounts in X, Y, and Z.
             */
            ErPoint3D_Set(&transformData, 1, 14, 42);

25          /*
             * Create transform object
             */
            transform = ErTranslateTransform_New(&transformData);

30          /*
             * Add transform object to group object
             */
            ErGroup_AddObject(group, transform);

35          /*
             * Dispose local reference to transform - the group
             * will retain its own copy of (i.e., reference to)
             * the object.
             */
40          ErObject_Dispose(transform);
        }

/*
45       * Create a group to live within the main group - this shows
         * how to create a very simple hierarchy.
         *
         * Also, the torus created to put inside the subgroup shows
         * an example of a geometry that is not directly supported by
50       * the renderer.  It must (internally) be decomposed into
         * geometric objects (polygons or triangles, for example)
         * that *are* directly supported by the renderer.
         */
        {
55          EtGroupObject      subGroup;
            EtGeometryObject   torus;
            EtTorusData        torusData;

/*
60           * Make a new group.
             */
```

Attorney Docket No.: APPL:P-0951MCF/WSW
wsw/appl/0951.001                                          Client Ref: P951 HSP

```
        subGroup = ErOrderedDisplayGroup_New();

/*
         * Add it as an element of the main group.
         */
        ErGroup_AddObject(group, subGroup);

/*
         * Make a torus to put into it the subgroup.
         */
        ErPoint3D_Set(&torusData.origin, 3, 7, 12);
        ErVector3D_Set(&torusData.orientation, 0, 1, 0);
        ErVector3D_Set(&torusData.majorRadius, 0, 0, 1);
        ErVector3D_Set(&torusData.minorRadius, 1, 0, 0);
        torusData.torusAttributeSet = NULL;

/*
         * Create torus object
         */
        torus = ErTorus_NewData(&torusData);

/*
         * Add torus object to sub group object
         */
        ErGroup_AddObject(subGroup, torus);

/*
         * Dispose local reference to torus - the group
         * will retain its own copy of (i.e., reference to)
         * the object. Do the same with the new group - the
         * main group will retain a reference of its own.
         */
        ErObject_Dispose(torus);
        ErObject_Dispose(subGroup);
    }

/*
     * This is the rendering loop. Render one frame, traversing
     * the model as many times as renderer demands.
     */
    ErView_StartRendering(view);
    do {
        ErDisplayGroup_Draw(group, view);
    } while (ErView_EndRendering(view) == EcViewStatus_ReTraverse);

/*
     * Now, associate a different renderer with the view.
     * This operation also deletes the renderer previously
     * associated with the view.
     */
    ErView_SetRendererByType(view, EcRendererType_ZBuffer);

/*
     * This is the rendering loop again, this time with the other
     * renderer.
     */
    ErView_StartRendering(view);
    do {
        ErDisplayGroup_Draw(group, view);
    } while (ErView_EndRendering(view) == EcViewStatus_ReTraverse);
```

- 122 -

```
      /*
       *  Get rid of retained objects.
       */
 5    ErObject_Dispose(view);
      ErObject_Dispose(group);

/*
       *  Exit Escher
10     */
      ErExit();
    }
```

- 123 -

APPENDIX B

ErWF_Geometry_Polygon()

Copyright © 1994 Apple Computer, Inc.

```
       EtStatus ErWF_Geometry_Polygon(
 5         EtGeometryObject   geom,
           EtViewObject       view)
       {
           EtWFPrivate            *priv;
           const EtPolygonData    *polygonData;
10         const EtTriangleData   *triangleData;
           EtRenderPipelineData   prim;
           EtFillStyle            fillStyle;
           EtObjectType           geometryType;
           unsigned long          numVertices;
15         EtVertex3D             *vertices;
           EtAttributeSet         geomAttributeSet;

if( EiView_IsRenderingCancelledFromIdlerCall(view) == EcTrue)
               return (EcSuccess);
20
           priv = (EtWFPrivate *)ErView_GetRendererPrivate (view);

if (EiDrawRegion_GetClipFlags(priv->renderInfo.drawRegion) &
                                           EcClipMask_NotExposed)
25         {
               return (EcFailure);
           }

/*
30          * This code does both lines and polylines. We check the type
            * of the incoming object, and do the right thing, which
            * mostly means just getting the data from the right place.
            */
           geometryType = EiGeometry_GetType(geom);
35
           switch (geometryType) {
               case EcGeometryType_Triangle : {
                   triangleData   = ErTriangle_GetDataPointer(geom);
                   numVertices    = 3;
40                 vertices       = (EtVertex3D *) triangleData->vertices;
                   geomAttributeSet = (EtAttributeSet)
                                       triangleData->triangleAttributeSet;
                   break;
               }
45             case EcGeometryType_Polygon : {
                   polygonData    = ErPolygon_GetDataPointer(geom);
                   numVertices    =
                       (unsigned long) polygonData->numVertices;
                   vertices       = (EtVertex3D *) polygonData->vertices;
50                 geomAttributeSet = (EtAttributeSet)
                                       polygonData->polygonAttributeSet;

break;
               }
55             default : {
                   EiError_Post(EcError_CheesyError,
```

Attorney Docket No.: APPL:P-0951MCF/WSW
wsw/appl/0951.001                                    Client Ref: P951 HSP

- 124 -

```
                    EiError_Message("%s: The geometry is not of type
            EcGeometryType_Polygon nor EcGeometryTypeTriangle",
                                    "ErWF_Geometry_Polygon"));
                break;
            }
        }

ErWF_SetupPipelineState(view, &priv->renderInfo);

ErView_GetFillStyleState(view, &fillStyle);

if (!ErRender_GrowFullStaticPrim(&priv->staticPrim,
                                                    numVertices)){
            EiError_Post(EcError_CheesyError,
                    EiError_Message("%s: Out of memory",
                            "ErWF_Geometry_Polygon"));
            return (EcFailure);
        }
        prim.primitiveType      = EcPolygon_Primitive;
        prim.validFields        = EcNone;

prim.numVertices        = numVertices;
        prim.worldVertices      = priv->staticPrim.worldVertices;
        prim.deviceVertices4D   = priv->staticPrim.deviceVertices4D;
        prim.vertexFlags        = priv->staticPrim.vertexFlags;
        prim.colors             = NULL;

prim.primNormal         = priv->staticPrim.primNormal;
        prim.primColor          = priv->staticPrim.primColor;
        prim.worldPrimNormal    = priv->staticPrim.worldPrimNormal;
        prim.renderPrimColor    = priv->staticPrim.renderPrimColor;

if (geomAttributeSet) {
            EtSwitch            highlightSwitch;

if ((ErAttributeSet_Get(
                    geomAttributeSet,
                    EcAttributeType_DiffuseColor,
                    prim.primColor) == EcSuccess)) {
                prim.validFields |= EcRender_SurfaceColor;
            } if ((ErAttributeSet_Get(
                    geomAttributeSet,
                    EcAttributeType_Normal,
                    prim.primNormal) == EcSuccess)) {
                prim.validFields |= EcRender_SurfaceNormal;
            } if ((ErAttributeSet_Get(
                    geomAttributeSet,
                    EcAttributeType_HighlightState,
                    &highlightSwitch) == EcSuccess)) {
                if (highlightSwitch == EcOn) {
                    EtAttributeSet      highlightStyle;

/* Get the diffuse color from the highlight style */
                    ErView_GetHighlightStyleState(
                                            view, &highlightStyle);
```

Attorney Docket No.: APPL:P-0951MCF/WSW
wsw/appl/0951.001

Client Ref: P951 HSP

- 125 -

```
            if (highlightStyle && (ErAttributeSet_Get(
                                    highlightStyle,
                                    EcAttributeType_DiffuseColor,
                                    prim.primColor) ==
                                        EcSuccess)) {
                prim.validFields |= EcRender_SurfaceColor;
            }
        }
    } switch (fillStyle) {
        case EcFillStyle_Filled:
            ErWF_PolyEdgePipe(priv,
                              &prim,
                              (EtPoint3D *)vertices,
                              numVertices,
                              sizeof(EtVertex3D),
                              NULL);
            break;
        case EcFillStyle_Edges:   /* line drawing pipeline */
            ErWF_PolyEdgePipe(priv,
                              &prim,
                              (EtPoint3D *)vertices,
                              numVertices,
                              sizeof(EtVertex3D),
                              NULL);
            break;
        case EcFillStyle_Points:
            ErWF_PolyPointPipe(priv,
                               &prim,
                               (EtPoint3D *)&vertices[0],
                               numVertices,
                               sizeof(EtVertex3D),
                               NULL);
            break;
    }

/* unimplemented yet
    if (prim.userData) {
        EiMemory_Delete(prim.userData);
    }
    */ return (EcSuccess);
}
```

We claim:

1. A method for creating a representation of a scene displayable on a graphical output device, comprising the steps of:

providing a representation of a first object;

providing a plurality of quality control data groups, each having a plurality of quality control type variables, each of said type variables containing a value which selects among a plurality of options in a respective tradeoff between rendering quality and rendering speed;

selecting a selected one of said quality control data groups to an object drawing subsystem; and invoking said object drawing subsystem to render said first object into said scene, wherein said object drawing subsystem renders said first object into said scene in accordance with the values in each of said type variables in said selected quality control data group.

2. A method according to claim 1, wherein said first object comprises a model containing a plurality of sub-objects.

3. A method according to claim 1, wherein said step of providing a plurality of quality control data groups comprises the steps of:

providing a plurality of preliminary quality control data groups, each having said plurality of quality control type variables; and invoking a value setting procedure with an identification of a desired one of the quality control type variables, a desired one of said quality control data groups, and a desired value to write into said desired variable in said desired group, wherein said value setting procedure writes said desired value into said desired variable in said desired group.

4. A method according to claim 1, wherein said step of providing a plurality of quality control groups comprises the steps of:

providing a preliminary plurality of said quality control data groups; and invoking a data group adding procedure to add a desired new one of said quality control data groups to said preliminary plurality of quality control data groups.

5. A method according to claim 4, wherein each of said quality control data groups in said preliminary plurality of quality control data groups has a different respective index value associated therewith, and wherein said step of providing a plurality of quality control data groups further comprises the step of associating a desired new index value with said desired new quality control data group, said desired new index value being different from the index values associated with each of said quality control data groups in said preliminary plurality of quality control data groups.

6. A method according to claim 1, wherein each of said quality control data groups in said plurality of quality control data groups has a respective index value associated therewith, wherein said step of selecting a selected one of said quality control data groups comprises the step of invoking a data group selection procedure with a desired index value, and wherein said data group selection procedure selects said selected one of said quality control data groups in response to said desired index value.

7. A method according to claim 6, wherein said data group selection procedure selects said selected one of said quality control data groups as one of said quality control data groups in said plurality of quality control data groups whose associated index value is nearest to said desired index value.

8. A method according to claim 1, wherein a first one of said quality control type variables contains a value which selects whether (a) shaders should be computed by a high quality method; (b) shaders should be computed by a high quality method; or (c) shaders should not be computed.

9. A method according to claim 1, wherein a first one of said quality control type variables contains a value which selects a level of detail with which said object drawing subsystem should render said first object into said scene.

10. A method according to claim 1, wherein said plurality of quality control type variables includes at least two of the group consisting of:

(a) a line style variable containing a value indicating whether said object drawing subsystem should render said first object into said scene with line styles on or off;

(b) a shader variable containing a value indicating whether said object drawing subsystem should render said first object into said scene with shaders off, on or with a fast shader algorithm;

(c) an illumination variable containing a value indicating whether said object drawing subsystem should render said first object into said scene with illumination off, on or with a fast illumination algorithm;

(d) a level of detail variable containing a value indicating whether said object drawing subsystem should render said first object into said scene with level of detail on or off;

(e) a compute shadows variable containing a value indicating whether said object drawing subsystem should compute shadows when rendering said first object into said scene;

(f) a compute transparency variable containing a value indicating whether said object drawing subsystem should compute transparency when rendering said first object into said scene;

(g) a compute reflections variable containing a value indicating whether said object drawing subsystem should compute reflections when rendering said first object into said scene;

(h) a backfacing removal variable containing a value indicating whether said object drawing subsystem should render said first object into said scene with backfacing removal on or off;

(i) an interpolation variable containing a value indicating whether said object drawing subsystem should render said first object into said scene with flat, gouraud or phong interpolation;

(j) a progressive refinement variable containing a value indicating whether said object drawing subsystem should render said first object into said scene with progressive refinement on or off;

(k) an antialiasing level variable containing a value indicating an antialiasing level with which said object drawing subsystem should render said first object into said scene; and (l) a ray depth variable containing a value indicating a ray depth with which said object drawing subsystem should render said first object into said scene.

11. A data processing system having a memory for storing data for access by software being executed by said data processing system, said memory having a quality collection object data structure stored therein, said quality collection object data structure including a plurality of quality control data groups, each having a plurality of quality control type variables, each of said type variables containing a value which selects among a plurality of options in a respective tradeoff between graphics rendering quality and graphics rendering speed, further comprising an object drawing subsystem which, when invoked, renders a first object into a scene in accordance with the values in each of said type variables in a selected one of said quality control data groups.

12. A data processing system according to claim 11, wherein said memory further has stored therein a respective quality control index value associated with each of said quality control data groups.

13. A data processing system according to claim 11, wherein said memory further has stored therein:

selection software instructions which, when executed, select said selected one of said quality control data groups to said object drawing subsystem.

14. A data processing system according to claim 13, wherein said memory further has stored therein a respective quality control index value associated with each of said quality control data groups, wherein said memory further has stored therein application software instructions which invoke said selection software instructions with an indication of a desired quality control index value, and wherein said selection software instructions include instructions which, when executed, select said selected quality control data group in response to said desired quality control index value indicated by said application software instructions.

15. A computer readable medium for use with a data processing system having a memory, an application program, an object drawing subsystem, and a graphical output device, said medium having embodied therein a plurality of software procedures callable by said application program, including:

at least one procedure which, in response to calls by said application program, provides a plurality of quality control data groups, each having a plurality of quality control type variables, each of said type variables containing a value which selects among a plurality of options in a respective tradeoff between rendering quality and rendering speed;

a data group selection procedure which, in response to a call by said application program, selects a selected one of said quality control data groups to an object drawing subsystem; and a procedure which, in response to a call by said application program, invokes said object drawing subsystem to render a first object into a scene displayable on said graphical output device, wherein said object drawing subsystem renders said first object into said scene in accordance with the values in each of said type variables in said selected quality control data group.

16. A medium according to claim 15, wherein said first object comprises a model containing a plurality of sub-objects.

17. A medium according to claim 15, wherein said at least one procedure which provides a plurality of quality control data groups, comprises:

a procedure which, in response to a call by said application program, provides a plurality of preliminary quality control data groups, each having said plurality of quality control type variables; and a value setting procedure which, in response to a call by said application program with an identification of a desired one of the quality control type variables, a desired one of said quality control data groups, and a desired value to write into said desired variable in said desired group, writes said desired value into said desired variable in said desired group.

18. A medium according to claim 15, wherein said at least one procedure which provides a plurality of quality control data groups, comprises:

a procedure which, in response to a call by said application program, provides a preliminary plurality of said quality control data groups; and a data group adding procedure which, in response to a call by said application program, adds a desired new one of said quality control data groups to said preliminary plurality of quality control data groups.

19. A medium according to claim 15, wherein each of said quality control data groups in said plurality of quality control data groups has a respective index value associated therewith, wherein said data group selection procedure is called by said application program with a desired index value, and wherein said data group selection procedure selects said selected one of said quality control data groups in response to said desired index value.

20. A medium according to claim 19, wherein said data group selection procedure selects said selected one of said quality control data groups as one of said quality control data groups in said plurality of quality control data groups whose associated index value is nearest to said desired index value.

21. A data processing system having a memory for storing data for access by software being executed by said data processing system, said memory having a quality collection object data structure stored therein, said quality collection object data structure including a plurality of quality control data groups, each having a plurality of quality control type variables, each of said type variables containing a value which selects among a plurality of options in a respective trade-off between graphics rendering quality and graphics rendering speed, said memory further having stored therein software instructions which, when executed, select a selected one of said quality control data groups to an object drawing subsystem for rendering.

22. A data processing system according to claim 21, wherein said memory further has stored therein a respective quality control index value associated with each of said quality control data groups.

* * * * *